(12) United States Patent
Liang et al.

(10) Patent No.: US 11,470,590 B2
(45) Date of Patent: Oct. 11, 2022

(54) TIME-DOMAIN RESOURCE ALLOCATION AND DETERMINATION METHOD AND APPARATUS, BASE STATION, TERMINAL, AND STORAGE MEDIUM

(71) Applicant: ZTE CORPORATION, Guangdong (CN)

(72) Inventors: Yachao Liang, Guangdong (CN); Peng Hao, Guangdong (CN); Jian Li, Guangdong (CN); Junfeng Zhang, Guangdong (CN)

(73) Assignee: ZTE CORPORATION

( * ) Notice: Subject to any disclaimer, the term of this patent is extended or adjusted under 35 U.S.C. 154(b) by 0 days.

(21) Appl. No.: 17/053,833

(22) PCT Filed: May 9, 2019

(86) PCT No.: PCT/CN2019/086087
§ 371 (c)(1),
(2) Date: Nov. 9, 2020

(87) PCT Pub. No.: WO2019/214657
PCT Pub. Date: Nov. 14, 2019

(65) Prior Publication Data
US 2021/0235440 A1     Jul. 29, 2021

(30) Foreign Application Priority Data
May 11, 2018   (CN) .......................... 201810449607.6

(51) Int. Cl.
*H04W 72/04*     (2009.01)

(52) U.S. Cl.
CPC ...... *H04W 72/0413* (2013.01); *H04W 72/044* (2013.01)

(58) Field of Classification Search
CPC ........... H04W 72/0413; H04W 72/044; H04W 72/0446; H04W 72/042; H04W 72/0453;
(Continued)

(56) References Cited

U.S. PATENT DOCUMENTS

| | | | |
|---|---|---|---|
| 2019/0261317 A1* | 8/2019 | Nammi | H04L 5/0057 |
| 2019/0312635 A1* | 10/2019 | Ang | H04L 5/001 |

(Continued)

FOREIGN PATENT DOCUMENTS

| | | |
|---|---|---|
| CN | 102648599 | 8/2012 |
| CN | 102859915 | 1/2013 |

(Continued)

OTHER PUBLICATIONS

Patent Cooperation Treaty (PCT), International Search Report and Written Opinion for Application PCT/CN2019/086087 filed on May 9, 2019, dated Jul. 10, 2019, International Searching Authority, CN.
(Continued)

*Primary Examiner* — Siu M Lee
(74) *Attorney, Agent, or Firm* — McDonald Hopkins LLC

(57) ABSTRACT

Provided are a time-domain resource allocation and determination method, apparatus, base station, terminal and storage medium. The allocation method includes: determining a number of switching time slots required for current bandwidth part resource switching according to an original bandwidth part resource and a target bandwidth part resource, the original bandwidth part resource is a bandwidth part resource used by a terminal before the current bandwidth part resource switching and the target bandwidth part resource is a bandwidth part resource used by the terminal after the current bandwidth part resource switching; and determining a target time slot deviation for performing a data transmission by using the target bandwidth part resource according to the number of switching time slots and
(Continued)

a basic time slot deviation, the basic time slot deviation is determined according to time-domain resource allocation indication information carried in transmission indication information sent by a base station.

14 Claims, 6 Drawing Sheets

(58) Field of Classification Search
CPC ............ H04W 72/0406; H04L 5/0051; H04L 5/0007; H04L 5/0023; H04L 5/0044; H04L 5/0094
See application file for complete search history.

(56) References Cited

U.S. PATENT DOCUMENTS

2019/0312682 A1* 10/2019 Nammi ................ H04L 1/1893
2019/0313385 A1* 10/2019 Yang ..................... H04L 1/189

FOREIGN PATENT DOCUMENTS

| CN | 104756416 | 7/2015 |
|----|-----------|--------|
| WO | 2011071944 | 6/2011 |
| WO | 2012011658 | 1/2012 |
| WO | 2018066899 | 4/2018 |

OTHER PUBLICATIONS

Huawei et al., "Summary of remaining issues on bandwidth part and wideband operation," 3GPP Draft, R1-1801347, Feb. 26, 2018, Greece.
Qualcomm Incorporated: "Remaining Issues on BWP," 3GPP Draft: R1-1802844, Mar. 2, 2018, Greece.
Ericsson et al., "Way forward on BWP Switching," 3GPP Draft, R4-1805540, Apr. 16, 2018, Australia.
Extended European Search Report for Application No. 19799579.8, PCT/CN2019086087, dated Jan. 7, 2022, 12 pgs., European Patent Office, Germany.
ZTE, "Remaining issue for BWP," 3GPP Draft, R1-1806135, May 21, 2018, Korea.
HiSilicon, "Remaining issue on L2 buffer size calculation," 3GPP Draft, R2-1805587, Apr. 16, 2018, China.
Intel Corporation, "LS on BWP switching delay," 3GPP Draft, R4-1803283, Feb. 26, 2018, Greece.
MediaTek Inc., "Interruption requirements due to BWP switching," 3GPP Draft, R4-1803686, Apr. 16, 2018, Australia.
Japan Patent Office (JPO), Notification of Reasons for Refusal for Patent Application No. 2020-563445, drafted Jan. 5, 2022, dated Jan. 11, 2022, Fourth Patent Examination Department, Japan.
Intellectual Property of India, Office Action for Patent Application No. 202027053856, dated Dec. 22, 2021, India.

* cited by examiner

TIME-DOMAIN RESOURCE ALLOCATION AND DETERMINATION METHOD AND APPARATUS, BASE STATION, TERMINAL, AND STORAGE MEDIUM

CROSS-REFERENCE TO RELATED APPLICATION

This application is a 35 U.S.C. 371 national stage filing of PCT Application No. PCT/CN2019/086087 filed on May 9, 2019, which-claims priority to Chinese patent application No. 201810449607.6 filed with CHIPA on May 11, 2018, the disclosures of which are incorporated herein by reference in their entireties

TECHNICAL FIELD

The present application relates to the field of communications, and in particular, to a time-domain resource allocation and determination method and apparatus, a base station, a terminal, and a storage medium.

BACKGROUND

The 5th Generation (5G) mobile communication technology introduces the concept of the bandwidth part (BWP) in order to reduce energy consumption of a user equipment (UE). A base station configures a set of BWPs for the UE, and then instructs the UE to dynamically switch the BWPs through downlink control information. The UE needs certain time to complete a switching from an original BWP to a target BWP, so the base station needs to reserve sufficient BWP switching time when performing the time-domain resource allocation; otherwise, the BWP switching of the UE will fail. However, in the related scheme, since a switching dedicated indication row needs to be set in a time-domain resource allocation table to specify a target time slot deviation to the UE after the switching occurs, one or more switching dedicated indication rows always exist in the time-domain resource allocation table regardless of whether the switching occurs. However, the number of rows in the time-domain resource allocation table is limited, after the switching dedicated indication row is set, a number of available rows capable of carrying indication information of other transmissions is reduced, thereby limiting the transmission of the indication information of other transmissions to a certain extent.

SUMMARY

The time-domain resource allocation and determination method and apparatus, base stations, terminal and storage medium provided by embodiments of the present disclosure mainly solve that: in the scheme proposed at the present stage, the base station sets a switching dedicated indication row in a time-domain resource allocation table of a BWP to specify a target time slot deviation under a condition of switching the bandwidth part resource, which requires a large number of rows in the time-domain resource allocation table, limits transmission of indication information of other transmissions, and is not conducive to optimizing resource configuration.

The present disclosure provide a time-domain resource determination method. The method includes steps described below.

A number of switching time slots required for current bandwidth part resource switching is determined according to an original bandwidth part resource and a target bandwidth part resource, the original bandwidth part resource is a bandwidth part resource used by a terminal before the current bandwidth part resource switching, and the target bandwidth part resource is a bandwidth part resource used by the terminal after the current bandwidth part resource switching;

a target time slot deviation for performing data transmission by using the target bandwidth part resource is determined according to the number of switching time slots and a basic time slot deviation, and the basic time slot deviation is determined according to time-domain resource allocation indication information carried in transmission indication information sent by a base station.

The present disclosure further provide a time-domain resource allocation method. The method includes steps described below.

A target bandwidth part resource used by a transmission after current bandwidth part resource switching is determined;

transmission indication information containing both of an index identifier of the target bandwidth part resource and time-domain resource allocation indication information is sent to a terminal.

The present disclosure further provide a time-domain resource determination apparatus. The apparatus includes a switching determination unit and a target time slot determination unit.

The switching determination unit is configured to determine a number of switching time slots required for current bandwidth part resource switching according to an original bandwidth part resource and a target bandwidth part resource, where the original bandwidth part resource and the target bandwidth part resource are respectively a bandwidth part resource used by a terminal before the current bandwidth part resource switching and a bandwidth part resource used by the terminal after the current bandwidth part resource switching;

the target time slot determination unit is configured to determine, according to the number of switching time slots and a basic time slot deviation, a target time slot deviation for performing a data transmission by using the target bandwidth part resource, where the basic time slot deviation is determined according to time-domain resource allocation indication information carried in transmission indication information sent by a base station.

The embodiments of the present disclosure further provide a time-domain resource allocation apparatus. The apparatus includes a switching determination unit and an indication transmission unit.

The switching determination unit is configured to determine a target bandwidth part resource used by a transmission after current bandwidth part resource switching;

the indication transmission unit is configured to send transmission indication information containing an index of the target bandwidth part resource and time-domain resource allocation indication information to a terminal.

The embodiments of the present disclosure further provide a base station. The base station includes a processor, a memory, a communication device, and a communication bus;

the communication bus is configured to implement a connection communication between the processor and the memory and a connection communication between the processor and the communication device;

the processor is configured to execute at least one program stored in the memory to implement any one time-domain resource allocation method described above.

The embodiments of the present disclosure further provide a terminal. The terminal includes a processor, a memory, a communication device, and a communication bus;

the communication bus is configured to implement a connection communication between the processor and the memory and a connection communication between the processor and the communication device;

the processor is configured to execute at least one program stored in the memory to implement any one time-domain resource determination method described above.

The present disclosure further provide a storage medium. The storage medium stores at least one of a time-domain resource allocation program or a time-domain resource determination program, where the time-domain resource allocation program is executable by at least one processor to implement any of the time-domain resource allocation method described above; and the time-domain resource determination program is executable by the at least one processor to implement any of the time-domain resource determination method described above.

The present disclosure provide the time-domain resource allocation and determination method, apparatus, the base station, the terminal and the storage medium, which solves that when a switching-dedicated indication row is set in a time-domain resource allocation table of a BWP, transmission of other transmission indication information is easily limited and the optimization configuration of resources is not facilitated. In the scheme provided in the embodiments of the present disclosure, when a bandwidth part resource for performing a data transmission with a terminal needs to be switched, a base station may determine a target bandwidth part resource used by a transmission after switching, and then send transmission indication information including a target bandwidth part resource index identifier to the terminal. After receiving the transmission indication information, the terminal may determine a number of switching time slots required for current bandwidth part resource switching according to the target bandwidth part resource and the original bandwidth part resource, thereby determining a target time slot deviation according to the number of switching time slots and the basic time slot deviation dedicated by the base station. Because in the scheme provided by the embodiments of the present disclosure, when the bandwidth part resource is switched, the terminal may determine the number of switching time slots based on the information provided by the base station and determine the target time slot deviation combined with the basic time slot deviation indicated by the base station, which does not need to rely on the switching-dedicated indication row in the time-domain resource allocation table. Therefore, according to the scheme provided by the embodiments of the present disclosure, which does not need to use one or more rows in the time-domain resource allocation table as the switching-dedicated indication row, thereby greatly reducing the occupation of the time-domain resource allocation table by the bandwidth part resource switching, saving the space in the time-domain resource allocation table, and providing more opportunities for the transmission of other transmission information, which is conducive to realizing the resource optimization allocation. Meanwhile, through the scheme of indicating the target time slot deviation by the switching-dedicated indication row in the time-domain resource allocation table, when the bandwidth part resource switching is not performed, which also needs to reserve the switching-dedicated indication row in the time-domain resource allocation table, and brings about a great waste of resources. Therefore, compared with the scheme proposed at this stage, the scheme provided by the embodiments of the present disclosure improves the resource utilization rate.

Other features of this application and corresponding beneficial effects are described in the latter part of the specification.

DETAILED DESCRIPTION

Figure 1:
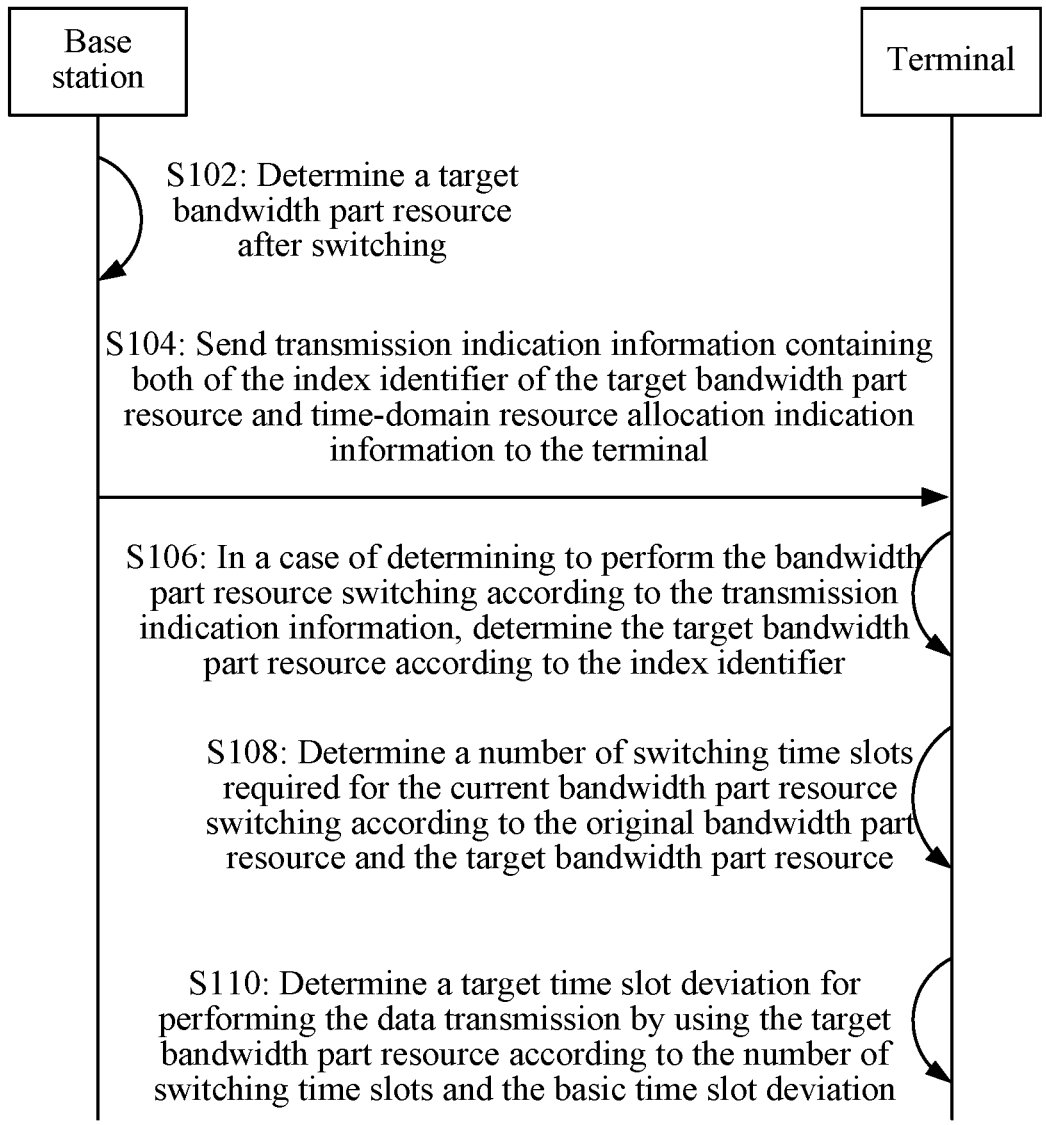
FIG. 1 is a schematic diagram of an interaction between a base station and a terminal in a time-domain resource allocation process according to an embodiment one of the present disclosure.

The present disclosure will be described in detail in connection with the embodiments and the accompanying drawings, from which the purpose, technical schemes and advantages of the present disclosure will be more apparent. It is to be understood that the embodiments described herein are intended to explain and not to limit the present application.

Embodiment One

With the development of the wireless communication technology and the increasing user requirements for communications, in order to meet requirements for the higher, faster and newer communication, the 5G technology has already become the trend of the future network development. Compared with the traditional long term evolution (LTE) technology, the 5G technology has made corresponding improvements in many aspects. For example, in order to reduce energy consumption of a UE in the communication process, the UE in the 5G is allowed to select a corresponding BWP according to the type of data that needs to be transmitted, which is conducive to avoiding unnecessary energy waste caused by all transmissions of the UE using a same bandwidth in the traditional LTE technology.

Before the UE performs a transmission, the base station will configure a set of BWPs for the UE, and the set of BWPs include BWPs used for uplink and BWPs used for downlink. Generally, the base station will configure four downlink BWPs and four uplink BWPs. For different BWPs, a subcarrier spacing (SCS), a bandwidth, and a frequency-domain position may be independently configured, that is, different BWPs may have different configuration parameters. The base station may indicate the UE to dynamically switch the BWP used by the transmission through downlink control information (DCI), so that the UE may switch to an appropriate BWP according to different transmission requirements, thereby reducing energy consumption during the transmission. BWP switching refers to a transformation from a currently used BWP (for ease of introduction, it will be hereinafter referred to as "original BWP") to a new BWP (for ease of introduction, it will be hereinafter referred to as "target BWP"). It should be noted that the UE does not perform data sending or reception during a process from determining to perform the BWP switching according to the received DCI to switching to the target BWP. Only after the BWP switching completes, the UE may continue to perform the data transmission on the target BWP.

It should be understood that a certain amount of time is required for the BWP switching, if the base station cannot guarantee the sufficient switching time for the UE when performing the time-domain resource allocation, which will lead to a failure of the BWP switching of the UE. In order to ensure the sufficient switching time of the UE, the scheme proposed in the present stage is that the base station sets a "switching-dedicated indication row" exclusively used for the BWP switching in the time-domain resource allocation table of the BWP, and the base station indicates a target time slot deviation after the corresponding switching in the switching-dedicated indication row. It should be understood that the target time slot deviation is calculated by the base station to ensure the UE having the sufficient switching time.

Taking the example that the base station configures four downlink BWPs for the UE, the time-domain resource allocation table of each BWP should include three switching-dedicated indication rows, which respectively correspond to scenarios of switching from other three BWPs to the BWP. For example, when the four downlink BWPs are A, B, C, and D, three switching-dedicated indication rows are set in the time-domain resource allocation table of A, which respectively indicate the target time slot deviation corresponding to a switching scenario from B to A, the target time slot deviation corresponding to a switching scenario from C to A, and the target time slot deviation corresponding to a switching scenario from D to A. Three switching-dedicated indication rows are also set in the time-domain resource allocation table of B, which respectively indicate the target time slot deviation corresponding to a switching scenario from A to B, the target time slot deviation corresponding to a switching scenario from C to B, and the target time slot deviation corresponding to a switching scenario from D to B.

Similarly, it is similar in the time-domain resource allocation tables of C and D. Therefore, if the base station needs to indicate the UE to switch the BWP, used for the communication between the base station and the UE, from D to B, the base station will send the DCI information to the UE through the original BWP, that is D, and the base station will indicate the UE to switch to the target BWP, that is B.

Meanwhile, the DCI information issued to the UE also carries a time-domain resource allocation indication field for specifying to the terminal to determine the target time slot deviation according to which row in the time-domain resource allocation table, so that the UE may determine a position of a corresponding target time-domain resource after switching from D to B by inquiring the time-domain resource allocation table.

It should be understood that a number of rows in the time-domain resource allocation table is limited and cannot be extended indefinitely. The number of rows in the time-domain resource allocation table may be related to a number of bits in the DCI information which are occupied by the time-domain resource allocation indication field, where the number of rows is usually $2^n$, and n is the number of bits occupied by the time-domain resource allocation indication field in the DCI information. For example, when n is 2, the time-domain resource allocation table may have 4 rows, and when n is 3, the time-domain resource allocation table may have 8 rows. Therefore, if a switching-dedicated indication row corresponding to each switching scenario is set in the time-domain resource allocation table, the time-domain resource allocation table may only use remaining rows to carry information of other transmission: continuing to take the example that the base station configures four downlink BWPs for the UE, in a case where the time-domain resource allocation table includes 4 rows, the base station may only use the remaining one row to carry the information of other transmissions; in a case where the time-domain resource allocation table includes 8 rows, the base station may use the remaining five rows to carry indication information of other transmissions . . . which severely limits transmission of the other indication information. Even, when the time-domain resource allocation indication field in the DCI information occupies only 1 bit, since the time-domain resource allocation table has only two rows, all necessary switching-dedicated indication rows cannot be covered in the time-domain resource allocation table.

In the above-mentioned time-domain resource allocation scheme, which needs to set the switching-dedicated indication row by occupying the time-domain resource allocation table, thereby causing of serious limitations to the transmission of other indication information. This embodiment provides a time-domain resource allocation method and a time-domain resource determination method, where the time-domain resource allocation method may be executed by a base station side, and the time-domain resource determination method may be executed by a terminal side. Referring to FIG. 1, FIG. 1 shows a schematic diagram of an interaction of a time-domain resource allocation process implemented by the base station executing the time-domain resource allocation method and by the terminal executing the time-domain resource determination method.

In S102, the base station determines a target bandwidth part resource used by a transmission after switching.

In a process of the data transmission between the base station and the terminal, the type of data transmitted between the base station and the terminal may change continuously, some data may require a relatively large bandwidth resource, and other data may have a low requirement on the bandwidth resource. Therefore, in order to reduce power consumption caused by transceiving data on the terminal side and to reasonably utilize the bandwidth resource, the base station may reasonably select one or more bandwidth part resources among all bandwidth part resources configured for the terminal according to the type of data currently to be transmitted. When a bandwidth part resource reselected by the base station is different from a currently used bandwidth part resource, "bandwidth part resource switching" needs to be performed, so the bandwidth part resource switching actually refers to a process of switching from a currently used "original bandwidth part resource" to a new "target bandwidth part resource". The "bandwidth part resource" in this embodiment actually refers to a continuous resource blocks (RBs) resource, and is also referred to as a BWP resource.

When the base station determines to switch the bandwidth part resource used between the base station and the terminal, the base station will obtain an index identifier of the target bandwidth part resource. For example, a downlink data transmission is to be performed between the base station and the terminal, but at this time, the base station finds that a currently used bandwidth part resource A is unsuitable and a bandwidth part resource C needs to be used, and then the base station determines that C is to be served as the target bandwidth part resource, thereby the obtained index identifier of the target bandwidth part resource is "c".

In S104, the base station sends transmission indication information containing both of an index identifier of the target bandwidth part resource and time-domain resource allocation indication information to the terminal.

After determining the target bandwidth part resource, the base station sends transmission indication information to the terminal, the transmission indication information carries the index identifier of the target bandwidth part resource. In this embodiment, the base station sends the transmission indication information to the terminal by using the original bandwidth part resource, so in some examples, the base station will send the transmission indication information by using the bandwidth part resource A. In some examples of this embodiment, the transmission indication information may include, but is not limited to, downlink control information (DCI).

Meanwhile, the transmission indication information sent by the base station may further include time-domain resource allocation indication information used for specifying a basic time slot deviation to the terminal, the basic time slot deviation is used for calculating a target time slot deviation on the terminal side after calculating a number of switching time slots required for the bandwidth part resource switching. The base station may use a time-domain resource allocation indication field in the transmission indication information (such as, the DCI) as the time-domain resource allocation indication information, and the time-domain resource allocation indication field specifies the basic time slot deviation to the terminal by cooperating with the time-domain resource allocation table. After the base station configures the time-domain resource allocation table, the terminal may obtain this time-domain resource allocation table, and in the time-domain resource allocation table, at least two basic time slot deviations may be configured. In order to let the terminal know to select which one from the at least two basic time slot deviations, the base station will carry the time-domain resource allocation indication field in the DCI information, and the time-domain resource allocation indication field may enable the terminal to select one basic time slot deviation specified by the base station from the time-domain resource allocation table. For example, 16 rows are included in the time-domain resource allocation table, each of these 16 rows is a configured basic time slot deviation, and unique identifiers of the 16 rows are numbers "0", "1" . . . "15", respectively. In the transmission indication information sent by the base station to the terminal, if a value corresponding to the time-domain resource allocation indication field is "2", which represents that the basic time slot deviation specified by the base station for the terminal is the one uniquely identified as "2" in the time-domain resource allocation table.

It should be understood that the time-domain resource allocation table is not fixed because it is configured by the base station, therefore, the terminal obtains different time-domain resource allocation tables when configuration of the time-domain resource allocation table by the base station is different. It should be understood that the base station and the terminal always use the current time-domain resource allocation table, that is, the newly configured time-domain resource allocation table to determine the basic time slot deviation.

It should be noted that the basic time slot deviation is a time-domain resource position configured by a radio resource control (RRC) layer of the base station and unrelated to a switching duration of the bandwidth part resource switching. The basic time slot deviation may not only be used for determining the target time slot deviation during the bandwidth part resource switching, but also be used for determining the target time slot deviation when the bandwidth part resource switching is not required. For example, in a process of continuously using a certain bandwidth part resource for performing the data transmission between the base station and the terminal, when the base station allocates the time-domain resource to the terminal, which is also performed through the time-domain resource allocation table. In this case, a basic time slot deviation in the time-domain resource allocation table specified by the base station is actually the target time slot deviation. Therefore, the basic time slot deviation does not need to ensure the terminal having the sufficient switching time. When configuring the basic time slot deviation, the base station does not need to care about whether the bandwidth part resource switching exists, and only needs to configure the basic time slot deviation according to the general time-domain resource configuration scheme. So, compared with the target time slot deviation exclusively used in a bandwidth part resource switching scenario and configured by the base station in the switching-dedicated indication row in the scheme discussed at this stage, the step in which the base station configures the basic time slot deviation in this embodiment is simpler, without considering the time limitation caused by the bandwidth part resource switching.

In the time-domain resource allocation table, the basic time slot deviation includes an uplink basic time slot deviation or a downlink basic time slot deviation, where the uplink basic time slot deviation corresponds to K2 in the time-domain resource allocation table, and the downlink basic time slot deviation corresponds to K0 in the time-domain resource allocation table. If the base station currently needs to send data to the terminal, and the terminal needs to receive the data, the basic time slot deviation specified by the base station for the terminal in the time-domain resource allocation table should be the downlink basic time slot deviation for the downlink, that is K0; if the base station currently needs to receive data sent by the terminal, a basic time slot deviation specified by the base station using the time-domain resource allocation table for the terminal should be the uplink basic time slot deviation for the uplink, that is, K2.

In addition, the time-domain resource allocation table in this embodiment is still set in a unit of a bandwidth part resource, that is, each bandwidth part resource has a corresponding time-domain resource allocation table.

In S106, when determining to perform the bandwidth part resource switching according to the transmission indication information, the terminal determines the target bandwidth part resource used by the transmission after the current bandwidth part resource switching according to the index identifier.

The terminal may receive the transmission indication information sent by the base station; according to the index identifier carried in the transmission indication information, the terminal may determine whether the bandwidth part resource switching is currently required. For example, the terminal will perform a "blind detection" on the original bandwidth part resource, and it is assumed that an index identifier of the original bandwidth part resource is "a". Through the blind detection, the terminal may receive the transmission indication information sent by the base station through the original bandwidth part resource A, and the transmission indication information carries the index identifier of the target bandwidth part resource. By comparing whether the index identifier of the original bandwidth part resource is consistent with the index identifier carried in the transmission indication information, the terminal may determine whether the bandwidth part resource switching is currently required. If the two identifiers are consistent, the bandwidth part resource switching is not required. However, if the two identifiers are inconsistent in the comparison result, the terminal determines that the base station has indicated the terminal to switch to another bandwidth part resource for performing the data transmission with the base station. In this case, the terminal may further determine which one is the target bandwidth part resource indicated by the base station. For example, in the foregoing example, since the index identifier carried by the base station in the transmission indication information is "c", "c" is inconsistent with the index identifier "a" of the original bandwidth part resource A targeted by the blind detection, so the terminal may know that the base station indicates the terminal to switch the bandwidth part resource, and the target bandwidth part resource used after switching is C having the index identifier "c".

A process of receiving the transmission indication information by the terminal through the blind detection is briefly introduced as follows.

Mapping types of shared channels for either the uplink or the downlink are generally divided into two types: a mapping type one (also known as mapping type A) and a mapping type two (also known as mapping type B). In the current standard 38.331, in order to more flexibly configure demodulation reference signal (DMRS) configuration corresponding to the two mapping types, the high layer of the base station uses independent DMRS configuration for the mapping type A and the mapping type B. In other words, DMRS configuration parameters of the mapping type A and DMRS configuration parameters of the mapping type B may be the same or different.

For the downlink, a DMRS type in the DMRS configuration parameters (may be "DL-DMRS-config-type" in the DMRS configuration parameters) and a DMRS maximum length (may be "DL-DMRS-max-len" in the DMRS configuration parameters) may affect a size of an antenna port field in the transmission indication information sent by the base station to the terminal, and then affect a size of the transmission indication information.

For the uplink, the DMRS type in the DMRS configuration parameters (may be "UL-DMRS-config-type" in the DMRS configuration parameters), the DMRS maximum length (may be "UL-DMRS-config-type" in the DMRS configuration parameters), and a physical uplink shared channel-transform precoder (PUSCH-tp) enable value may affect the size of the antenna port field in the transmission indication information sent by the base station to the terminal, and then affect the size of the transmission indication information.

There is no doubt that before receiving the transmission indication information sent by the base station, the terminal does not know whether the base station uses the mapping type A to send the transmission indication information or the mapping type B to send the transmission indication information. Therefore, the terminal cannot determine the size of the antenna port field in the transmission indication information, and thus cannot determine the size of the transmission indication information. In this case, if a size value of the blind detection is smaller than a size of the transmission indication information sent by the base station when the terminal performs the blink detection, the terminal will fail in the blind detection. After the blind detection fails, the terminal needs to perform the blind detection again in the same time slot, which increases the complexity of the blind detection. This embodiment provides two manners:

in a manner one: regardless of the DMRS configuration parameters corresponding to the two mapping types, the terminal performs the blind detection on the transmission indication information according to a case where the size of the antenna port field in the transmission indication information has a maximum value.

Table 1 shows, for a downlink shared channel, a corresponding relationship between the DMRS configuration parameters and the antenna port field:

TABLE 1

| DL-DMRS-config-type | DL-DMRS-max-len | Size of the antenna port field |
|---|---|---|
| 1 | 1 | 4 |
| 1 | 2 | 5 |
| 2 | 1 | 5 |
| 2 | 2 | 6 |

According to table 1, for the downlink, a maximum size of the antenna port field is 6. Therefore, if the terminal performs the detection on the transmission indication information according to the antenna port indication field of 6, the transmission indication information may be detected by the terminal at one time regardless of the mapping type used by the base station.

Table 2 shows, for an uplink shared channel, a corresponding relationship between the DMRS configuration parameters and the antenna port field:

TABLE 2

| UL-DMRS-config-type | UL-DMRS-max-len | PUSCH-tp | Size of the antenna port field |
|---|---|---|---|
| 1 | 1 | enable | 2 |
| 1 | 2 | enable | 4 |
| 1 | 1 | disable | 3 |
| 1 | 2 | disable | 4 |
| 2 | 1 | disable | 4 |
| 2 | 2 | enable | 5 |

Therefore, for the uplink, the maximum size of the antenna port field is 5, thus if the terminal performs the detection on the transmission indication information according to the antenna port indication field of 5, the transmission indication information may be detected by the terminal at one time regardless of the mapping type used by the base station.

Figure 2:
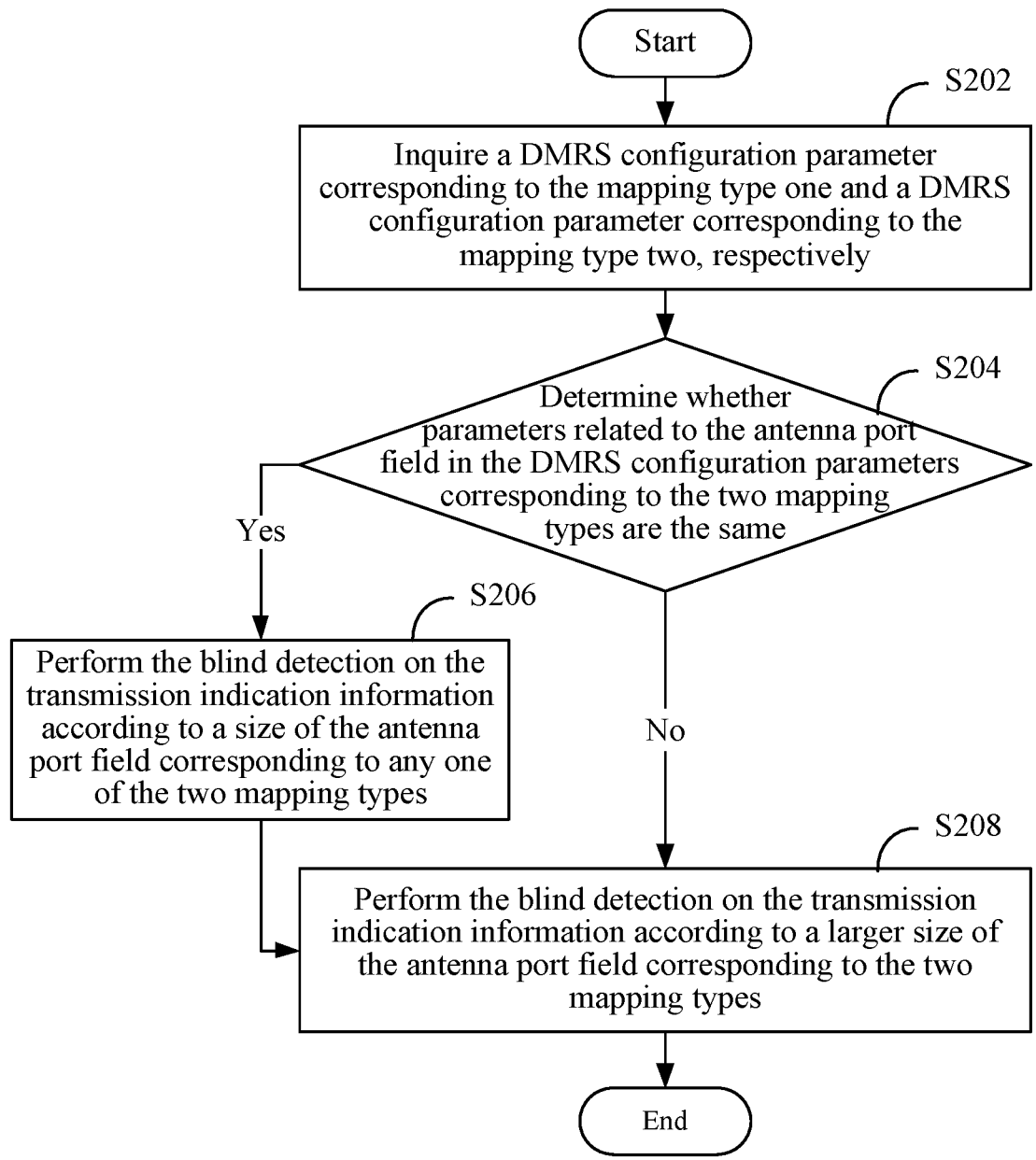
FIG. 2 is a flowchart of a blind detection of a terminal according to the embodiment one of the present disclosure.

In addition, the terminal may also perform the blind detection on the transmission indication information according to a manner two, as shown in FIG. 2.

In S202, a DMRS configuration parameter corresponding to the mapping type one and a DMRS configuration parameter corresponding to the mapping type two are respectively inquired.

After the high layer of the base station configures the configuration parameter corresponding to each mapping type of the shared channel, the terminal side may obtain the configuration parameter of the mapping type A of the shared channel and the configuration parameter of the mapping type B of the shared channel, and each of the configuration parameter of the mapping type A of the shared channel and the configuration parameter of the mapping type B of the shared channel includes the DMRS configuration parameters, so the terminal may inquiry and determine the DMRS configuration parameter corresponding to the mapping type A and the DMRS configuration parameter corresponding to the mapping type B.

In S204, the terminal determines whether parameters related to the antenna port field in the DMRS configuration parameters corresponding to the two mapping types are the same.

If a determination result is yes, S206 is executed, otherwise S208 is executed. In this embodiment, the parameters related to the antenna port field refer to parameters that may affect the size of the antenna port field. For the downlink, the parameters related to the antenna port field include a DMRS type and a DMRS maximum length. For the uplink, the parameters related to the antenna port field include the DMRS type, the DMRS maximum length, and a PUSCH-tp enable value.

In S206, the blind detection is performed on the transmission indication information according to the size of the antenna port field corresponding to any one of the two mapping types.

If the terminal determines that the parameters related to the antenna port filed in the DMRS configuration parameters corresponding to the two mapping types are the same, the terminal may detect the transmission indication information according to the mapping type A or the mapping type B.

In S208, the blind detection is performed on the transmission indication information according to a larger size of the antenna port field corresponding to the two mapping types.

If the terminal determines that the parameters related to the antenna port field in the DMRS configuration parameters corresponding to the two mapping types are different, for example, supposing that the terminal inquiries that DL-DMRS-config-type corresponding to the mapping type A of the downlink shared channel is equal to 1 and DL-DMRS-max-len corresponding to the mapping type A of the downlink shared channel is equal to 2, while DL-DMRS-config-type corresponding to the mapping type B of the downlink shared channel is equal to 1 and DL-DMRS-max-len corresponding to the mapping type B of the downlink shared channel is equal to 1, then if the base station sends the transmission indication information according to the mapping type A, the size of the antenna port field in the transmission indication information should be 5, and if the base station sends the transmission indication information according to the mapping type B, the size of the antenna port field should be 4. Although at this time the terminal cannot determine whether the size of the antenna port field in the transmission indication information sent by the base station is 5 or 4, in order to detect the transmission indication information at one time, the terminal may directly detect the transmission indication information according to a larger size of sizes of the antenna port field respectively corresponding to the two mapping types, that is, in the above example, the transmission indication information is detected according to the antenna port field of 5.

In S108, the terminal determines a number of switching time slots required for the current bandwidth part resource switching according to the original bandwidth part resource and the target bandwidth part resource.

It should be understood that not all bandwidth part resources require a same switching duration. Even the target bandwidth part resource is the same, the required switching duration may be different if switching from different original bandwidth part resources; similarly, even the original bandwidth part resource is the same but the target bandwidth part resource is different, the required switching duration may also be different. Let alone a switching scenario in which the target bandwidth part resource and the original bandwidth part resource are both different. Therefore, different switching scenarios may correspond to different switching durations.

In this embodiment, the switching scenario is mainly determined according to a relationship between configuration parameters of the original bandwidth part resource and configuration parameters of the target bandwidth part resource, in a switching scenario, the original bandwidth part resource and the target bandwidth part resource have a same bandwidth (BW), but have different center frequencies; in another switching scenario, the original bandwidth part resource and the target bandwidth part resource have a same center frequency, but have different BWs. In the existing standard conference at this stage, the following four switching scenarios are defined:

In a scenario one, the reconfiguration involves changing the center frequency of the BWP without changing its BW. The reconfiguration may or may not involve changing the SCS. Briefly, the scenario 1 refers to a bandwidth part resource switching scenario in which the target bandwidth part resource and the original bandwidth part resource have different center frequencies and a same BW regardless of whether the subcarrier spacing is the same or not.

In a scenario two, the reconfiguration involves changing the BW of the BWP without changing its center frequency. The reconfiguration may or may not involve changing the SCS. The scenario 2 refers to a bandwidth part resource switching scenario in which the target bandwidth part resource and the original bandwidth part resource have different BWs and a same center frequency regardless of whether the subcarrier spacing is the same or not.

In a scenario three, the reconfiguration involves changing both the BW and the center frequency of the BWP. The reconfiguration may or may not involve changing the SCS. The scenario 3 refers to a bandwidth part resource switching scenario in which the target bandwidth part resource and the original bandwidth part resource have different BWs and different center frequencies regardless of whether the subcarrier spacing is the same or not.

In a scenario four, the reconfiguration involves changing only the SCS, where the center frequency and BW of the BWP remain unchanged. The scenario 4 refers to a bandwidth part resource switching scenario in which the target bandwidth part resource and the original bandwidth part resource have a same BW and a same center frequency, but have different subcarrier spacings.

Figure 3:
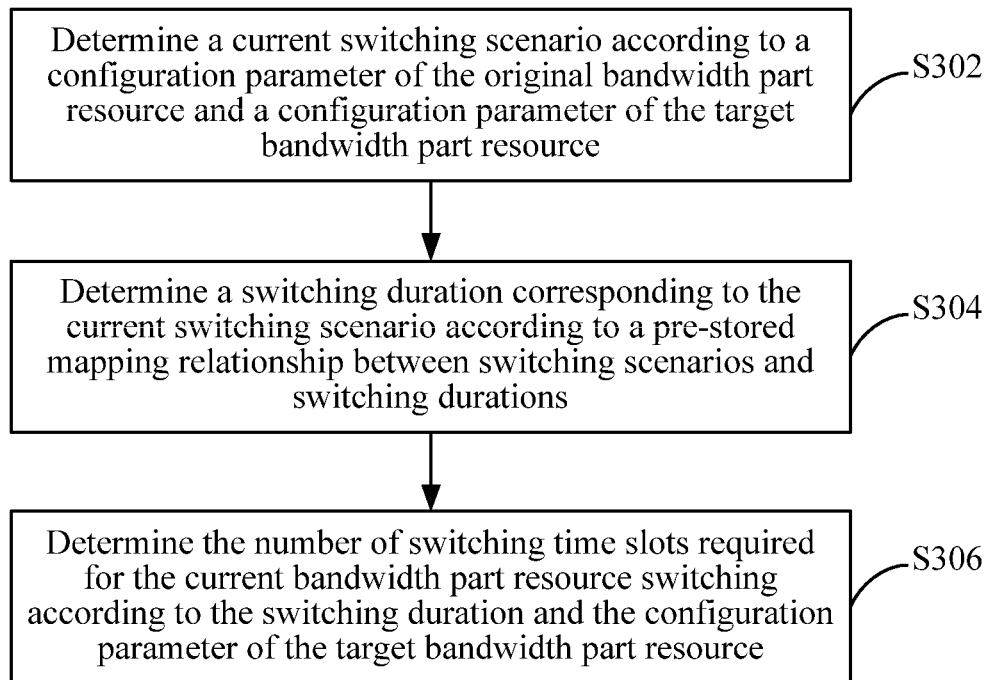
FIG. 3 is a flowchart of a terminal determining a number of switching time slots according to a target bandwidth part resource and an original bandwidth part resource according to the embodiment one of the present disclosure.

FIG. 3 shows a process of the terminal determining a number of switching time slots required for the current bandwidth part resource switching according to the original bandwidth part resource and the target bandwidth part resource.

In S302, a current switching scenario is determined according to a configuration parameter of the original bandwidth part resource and a configuration parameter of the target bandwidth part resource.

Since the bandwidth part resource switching scenario is related to the relationship between the configuration parameter of the original bandwidth part resource and the configuration parameter of the target bandwidth part resource, after the terminal determines the target bandwidth part resource, which one of the above scenarios the current switching scenario belongs to may be determined according to the configuration parameter of the original bandwidth part resource and the configuration parameter of the target bandwidth part resource. It should be understood that after the base station configures the bandwidth part resource for the terminal, the terminal side will store the configuration parameter of each bandwidth part resource. Of course, in other examples of this embodiment, even the terminal side does not store the configuration parameter of each bandwidth part resource, the base station may also inform the terminal through the transmission indication information.

It is assumed that the target bandwidth part resource C and the original bandwidth part resource A have a same BW but have different center frequencies. Therefore, according to the configuration parameters of the two bandwidth part resources, the terminal may determine that the bandwidth part resource switching currently required to be performed belongs to the bandwidth part resource switching in the scenario one.

In S304, according to a pre-stored mapping relationship between switching scenarios and switching durations, a switching duration corresponding to the current switching scenario is determined.

In this embodiment, the terminal pre-stores the mapping relationship between switching scenarios and switching durations, and each switching scenario has a corresponding switching duration. In other examples of this embodiment, the switching duration is not only related to the switching scenario, but also related to a frequency level of a carrier used for communication between the terminal and the base station, and the capability of the terminal. For example, in one example, the terminal stores a scenario-duration mapping relationship table, as shown in table 3 below:

TABLE 3

| Frequency level | Scenario | Switching duration of the type one (us) | Switching duration of the type two (us) |
| --- | --- | --- | --- |
| 1 | Scenario one | 600 | 2000 |
| | Scenario two | 600 | 2000 |
| | Scenario three | 600 | 2000 |
| | Scenario four | 400 | 950 |
| 2 | Scenario one | 600 | 2000 |
| | Scenario two | 600 | 2000 |
| | Scenario three | 600 | 2000 |
| | Scenario four | 400 | 950 |

In the column of the frequency level, "1" represents a scenario in which the carrier frequency is less than 6 GHz, and "2" represents a scenario in which the carrier frequency is greater than or equal to 6 GHz. "Switching duration of the type one" corresponds to switching durations in various switching scenarios with the terminal having a high capability, while "switching duration of the type two" corresponds to switching durations in various switching scenarios with the terminal having a low capability.

After determining the current bandwidth part resource switching scenario, the terminal may determine the corresponding switching duration according to the carrier frequency band used by its own communication and its own capability. Assuming that a certain terminal having the high capability uses the band level 1 for communication, and the current bandwidth part resource switching scenario is the scenario one, it may be determined that the switching duration of 600 us is required for the bandwidth part resource switching by inquiring table 3.

In S306, the number of switching time slots required for the current bandwidth part resource switching is determined according to the switching duration and the configuration parameter of the target bandwidth part resource.

After the terminal determines the switching duration, the switching duration needs to be converted into the number of switching time slots. It should be understood that the number of switching time slots is not only related to the switching duration, but also related to the subcarrier spacing of the target bandwidth part resource. The terminal may determine the time slot length corresponding to the subcarrier spacing of the target bandwidth part resource, then calculate a ratio of the switching duration to the single time slot length, and the number of switching time slots is calculated by rounding up the ratio.

In S110, according to the number of switching time slots and the basic time slot deviation, the terminal determines the target time slot deviation for performing the data transmission by using the target bandwidth part resource.

After calculating the number of switching time slots, the terminal may determine a value of the target time slot deviation, that is, a position where the target time-domain resource is located, based on the number of switching time slots, and the target bandwidth part resource is used for performing the data transmission.

In this embodiment, when the bandwidth part resource switching needs to be performed, the transmission indication information sent by the base station to the terminal includes time-domain resource allocation indication information, and the terminal may determine the basic time slot deviation according to the time-domain resource allocation indication information in conjunction with the time-domain resource allocation table of the target bandwidth part resource. The transmission indication information here is the DCI information for description: the DCI information includes a time-domain resource allocation field, and the time-domain resource allocation field is used for specifying a certain row in the time-domain resource allocation table, that is, for specifying one from two basic time slot deviations in the time-domain resource allocation table. Then, the terminal sums the basic time slot deviation and the number of switching time slots to determine the target time slot deviation corresponding to the current bandwidth part resource switching.

It should be understood that the terminal determines the target time slot deviation to determine a time slot position for performing the data transmission with the base station, and therefore, not only the terminal needs to determine the target time slot deviation, but the base station also needs to know this target time slot deviation. In order to enable the base station and the terminal to perform a normal data transmission at the target time-domain resource position corresponding to the target time slot deviation, the target time slot deviation determined by the base station and the target time slot deviation determined by the terminal should be consistent. Therefore, the base station side should also calculate the target time slot deviation in the same manner as the terminal side, which requires that the base station and the terminal use a same criteria for determining the switching scenario to which the current bandwidth part resource switching belongs, and the base station and the terminal store a same mapping relationship between switching scenarios and switching durations (for example, the base station also stores table 3). In addition, the base station needs to know the capability of the terminal and the like.

After determining the target time slot deviation, the terminal and the base station may perform the data transmission at the target time-domain resource position corresponding to the target time slot deviation. It should be understood that the target time slot deviation may include an uplink target time slot deviation and/or a downlink target time slot deviation. It is assumed that the target time slot deviation determined by the terminal is the downlink target time slot deviation, the terminal may receive data sent by the base station at the corresponding target time-domain resource position; and if the target time slot deviation determined by the terminal is the uplink target time slot deviation, the terminal may send data to the base station at the corresponding target time-domain resource position.

In the time-domain resource allocation method and the time-domain resource determination method provided by the embodiments of the present disclosure, the base station does not need to set a switching-dedicated indication row in the time-domain resource allocation table exclusively for the bandwidth part resource switching. Since the terminal may determine the number of switching time slots required for the current switching according to the original bandwidth part resource and the target bandwidth part resource, and further calculate the target time slot deviation, thereby avoiding a dedicated indication row to be set in the time-domain resource allocation table, thus affecting the transmission of other transmission indication information by the time-domain resource allocation table. It also avoids a situation in the related scheme that in the scenario of not requiring the bandwidth part resource switching, the space of the time-domain resource allocation table is wasted, since the switching-dedicated indication row needs to be set in the time-domain resource allocation table all the time. It is conducive to optimizing the resource transmission, and improving the resource utilization rate.

Furthermore, when the base station configures the time-domain resource allocation table, it does not need to care about whether the configured transmission time slot satisfies the switching duration of the terminal performing the bandwidth part resource switching, therefore the configuration is simpler.

Embodiment Two

Figure 4:
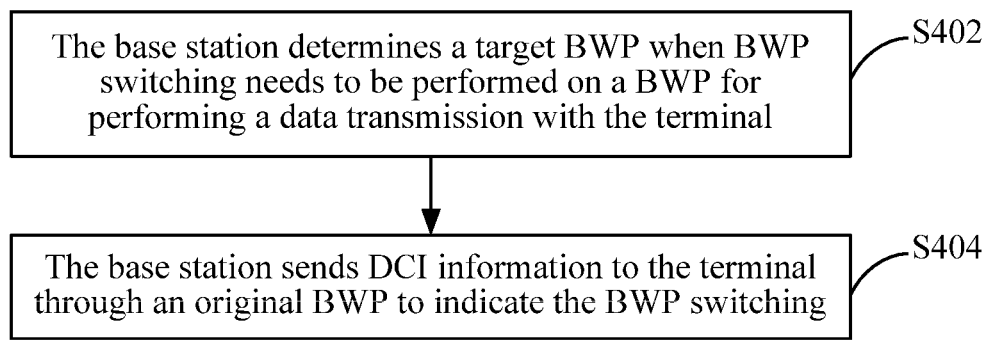
FIG. 4 is a flowchart of a time-domain resource allocation method according to an embodiment two of the present disclosure.

This embodiment will continue to introduce the time-domain resource allocation method and the time-domain resource determination method provided in the foregoing embodiments in conjunction with examples, as shown in FIG. 4:

In S402, the base station determines a target BWP when the base station needs to perform BWP switching on a BWP for performing the data transmission with the terminal.

For the purpose of satisfying the requirement of the data transmission with the terminal, the base station may control the terminal to perform the bandwidth part resource switching at some time, for example, before time t1, downlink data between the base station and the terminal has no high requirements on the bandwidth, but at time t1, the base station needs to send a large amount of video data to the terminal, and therefore, in order to ensure the experience of video viewing of a user at the terminal side, the base station needs to control the terminal to switch to a bandwidth part resource having a larger bandwidth to perform the data transmission. In this case, the base station may select one bandwidth part resource satisfying the transmission requirement as the target bandwidth part resource from bandwidth part resources which are pre-configured for the terminal.

In S404, the base station sends DCI information to the terminal through an original BWP to indicate the BWP switching.

After determining the target BWP, the base station may send the DCI indication information to the terminal, the DCI indication information may at least indicate following aspects: firstly, the DCI information may enable the terminal to determine that the bandwidth part resource switching needs to be currently performed; and the DCI information may also inform which target BWP needs to be switched to. In this embodiment, the DCI information may also indicate a basic time slot deviation to the terminal. In some examples, the base station may notify the terminal that the bandwidth part resource switching needs to be performed through a BWP indication field in the DCI information. For example, the base station carries an index identifier of the target BWP in the BWP indication field of the DCI information, after receiving the DCI information, the terminal may determine whether the bandwidth part resource switching needs to be performed by comparing whether an index identifier in the BWP indication field of the DCI information is consistent with an index identifier of the currently used BWP. If the two index identifiers are consistent, it represents that the bandwidth part resource switching does not need to be performed, and if the two index identifiers are inconsistent, it represents that the bandwidth part resource switching needs to be performed, and meanwhile, the terminal may further determine which one is the target BWP after switching.

In embodiment one, specifying the basic time slot deviation to the terminal through the time-domain resource allocation table and the time-domain resource allocation indication field has been described in details, which is not described herein again.

Since the terminal only performs the blind detection on the currently used BWP before the terminal knows that the bandwidth part resource switching needs to be performed, in order to ensure that the terminal may receive the DCI information sent by the base station, in this embodiment, the base station will transmit the DCI information through the original BWP.

After the base station sends the DCI information as the transmission indication information to the terminal, the base station may calculate a target time-domain resource position for performing the data transmission on the target BWP with the terminal, that is, a value of the target time slot deviation, and a process of the base station calculating the target time slot deviation is basically the same as a process of the terminal calculating the target time slot deviation. Therefore, the process may refer to the introduction in the embodiment one, or refer to the subsequent introduction.

Figure 5:
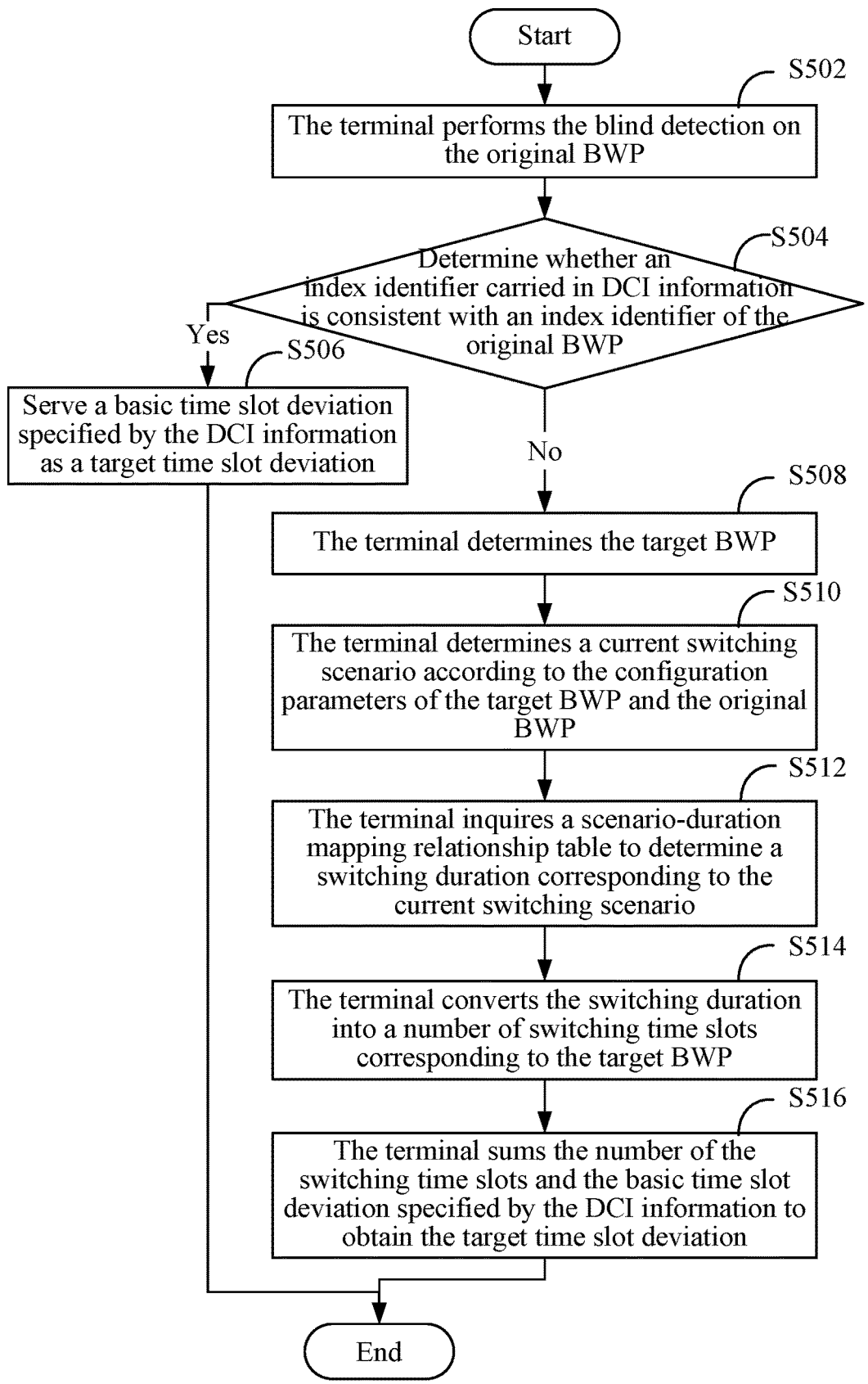
FIG. 5 is a flowchart of a time-domain resource determination method according to the embodiment two of the present disclosure.

The time-domain resource determination method on the terminal side will be further described below, in conjunction with a flow chart of the time-domain resource determination method as shown in FIG. 5:

In S502, the terminal performs a blind detection on the original BWP.

Although the terminal here is limited to perform the blind detection on the original BWP, in fact, the terminal does not know whether the switching will occur at this time. Therefore, in fact, for the terminal, the so-called original BWP is just a currently still used BWP. Through the blind detection, the terminal may detect the DCI information sent by the base station through the original BWP. The details of the blind detection may refer to the introduction in the embodiment one, which will not be repeated here.

In S504, the terminal determines whether an index identifier carried in the DCI information detected by the blind detection is consistent with an index identifier of the original BWP targeted by the blind detection.

After detecting the DCI information, the terminal firstly determines whether the index carried in the DCI information is consistent with the index of the original BWP targeted by the current blind detection, if so, it represents that the bandwidth part resource switching does not need to be performed currently, and S506 is executed. Otherwise, it represents that the base station has indicated to perform the bandwidth part resource switching, and therefore, S508 is executed.

It should be understood that the terminal knows the index of the currently used BWP, and for the index carried by the DCI information, the terminal may parse the detected DCI information and obtain the index from the BWP indication field of the DCI information.

In S506, the basic time slot deviation specified by the DCI information is used as a target time slot deviation.

If the terminal determines that the index carried in the DCI information is consistent with the index of the original BWP, the terminal determines that the bandwidth part resource switching is not required currently, so that the time-domain resources, namely the target time slot deviation, allocated for the terminal by the base station may be determined directly according to the time-domain resource allocation indication field in the DCI information in conjunction with the time-domain resource allocation table. The terminal may directly take the basic time slot deviation specified by the time-domain resource allocation indication field in the time-domain resource allocation table as the target time slot deviation.

For convenience of introduction, in this embodiment, a time slot size specified in the time-domain resource allocation table is referred to as the "basic time slot deviation", and for a scenario in which the bandwidth part resource switching does not need to be performed, the basic time slot deviation specified in the DCI is the target time slot deviation, so if the terminal determines that the base station does not indicate to perform the bandwidth part resource switching, the basic time slot deviation specified in the DCI may be directly referred to as the target time slot deviation.

The time-domain resource allocation table is briefly introduced as follows.

As can be known from the foregoing description, a number of rows of the time-domain resource allocation table is related to a number of bits occupied by the time-domain resource allocation indication field in the DCI information, and assuming that the time-domain resource allocation indication field occupies 3 bits in the DCI information, the time-domain resource allocation table includes 8 rows, each row is respectively allocated with a unique identifier, i.e., "0", "1", "2" . . . "7", respectively, that is, "0" corresponds to a first row in the table, "1" corresponds to a second row . . . and "7" corresponds to an eighth row in the table.

In the time-domain resource allocation table introduced in this embodiment, the table includes 3 columns, where a first column is used for indicating a downlink basic time slot deviation/an uplink basic time slot deviation, and the time-domain resource allocation tables of the downlink basic time slot deviation and the uplink basic time slot deviation are generally independent, that is, only the downlink basic time slot deviation is configured in the time-domain resource allocation table for the downlink, and the uplink basic times lot deviation is not carried; similarly, only the uplink basic time slot deviation is carried in the time-domain resource allocation table for the uplink, and the uplink basic time slot deviation is not carried. The downlink basic time slot deviation is usually characterized by "K0", and the uplink basic time slot deviation is usually characterized by "K2". A second column of the time-domain resource allocation table is used for carrying symbol allocation indication information within a time slot, and a third column is used for carrying a time-domain allocation mapping type.

Usually, the time-domain resource allocation table indicates the basic time slot deviation by cooperating with the time-domain resource allocation indication field, and the time-domain resource allocation indication field carries a unique identifier of a certain row, so that the base station may carry the unique identifier of the row in the time-domain resource allocation indication field of the DCI information when the base station wants to specify the basic time slot deviation of which the row to the terminal.

S508: the terminal determines the target BWP.

If the terminal determines that the index carried in the DCI information is inconsistent with the index of the original BWP, the terminal determines that the bandwidth part resource switching needs to be performed, so the terminal may determine which one is the target BWP according to the index carried in the DCI information, for example, assuming that the index carried in the DCI information is "d", it represents that the target BWP is D.

In S510, the terminal determines a current switching scenario according to the configuration parameters of the target BWP and the original BWP.

After the target BWP is determined, the terminal determines the configuration parameters of the target BWP, and also determines the configuration parameters of the original BWP, and in this embodiment, the terminal side stores the configuration parameters of each BWP configured by the base station for the terminal. By comparing the configuration parameters between two BWPs, the terminal may determine the current switching scenario.

In S512, the terminal inquires a scenario-duration mapping relationship table to determine a switching duration corresponding to the current switching scenario.

After the switching scenario is determined, the terminal may determine the switching duration corresponding to the current bandwidth part resource switching scenario by inquiring the scenario-duration mapping relationship table, which has been introduced in details in the embodiment one, and will not be described here again.

In S514, the terminal converts the switching duration into a number of switching time slots corresponding to the target BWP.

When converting the switching duration into the number of switching time slots, the terminal needs to combine the configuration parameters of the target BWP: the terminal firstly determines the subcarrier spacing (SCS) of the target BWP, and then determines the time slot length of the time slot in the target BWP according to the SCS of the target BWP. Then, the terminal calculates how many time slots are contained in the switching duration, a formula for calculating the number of switching time slots according to the switching duration is provided here:

$$\text{offset} = \lceil T/(-) \rceil,$$

where the offset represents the number of switching time slots, and T represents the switching duration inquired by the terminal according to the scenario-duration mapping relationship table. When the subcarrier spacing is 15 KHz, the corresponding time slot length is 1 ms; when the subcarrier spacing is 30 KHz, the corresponding time slot length is 0.5 ms; when the subcarrier spacing is 60 KHz, the corresponding time slot length is 0.25 ms . . . , that is, the relationship between u and the subcarrier spacing is satisfied: subcarrier spacing=$2^u \cdot 15$ (KHz). Several typical subcarrier spacings and corresponding values of u are shown in table 4:

TABLE 4

| u | Subcarrier spacing (KHz) |
|---|---|
| 0 | 15 |
| 1 | 30 |
| 2 | 60 |
| ... | ... |

The above formula for calculating the offset is simplified as follows:

$$\text{offset} = \lceil T*2 \rceil$$

A corresponding relationship among various switching durations, u and the number of switching time slots is shown in table 5, where various typical switching durations are shown in columns from a second column in a first row, and various values of u are shown in rows from a second row in a first column.

TABLE 5

| | Switching duration (us) | | | |
|---|---|---|---|---|
| u | 400 | 600 | 950 | 2000 |
| 0 | 1 | 1 | 1 | 2 |
| 1 | 1 | 2 | 2 | 4 |
| 2 | 2 | 3 | 4 | 8 |
| 3 | 4 | 5 | 8 | 16 |
| 4 | 7 | 20 | 16 | 32 |
| ... | ... | ... | ... | ... |

Therefore, after the switching duration of the current bandwidth part resource switching is determined according to table 3 and a value of u corresponding to the target bandwidth part resource is inquired according to table 4, the corresponding number of switching time slots may be inquired directly according to table 5. It should be understood that, for the convenience of inquiring, contents of table 3, table 4 and table 5 may also be organically combined to obtain one comprehensive table, so that the terminal may inquiry and determine the number of switching time slots directly according to one table after receiving the transmission indication information.

In S516, the terminal sums the number of switching time slots and the basic time slot deviation specified in the DCI information to obtain the target time slot deviation.

After the number of switching time slots is calculated, the terminal may sum the number of switching time slots and the basic time slot deviation inquired from the time-domain resource allocation table to determine the target time slot deviation, that is, the target time-domain resource position for performing the data transmission between the terminal and the base station after the bandwidth part resource switching. For the process of determining the basic time slot deviation, the detailed description is already given in S506 above, which will not be repeated here.

According to the time-domain resource allocation method and the time-domain resource determination method provided by this embodiment, when the base station allocates the time-domain resource for the terminal, it may not only ensure that the terminal has enough time for performing the bandwidth part resource switching, but also an additional signaling overhead is not required to be brought on the basis of the relevant scheme, and meanwhile, the flexibility of the base station in allocating the time-domain resource may be improved by reducing the consideration of the base station allocating the time-domain resource allocation table.

Embodiment Three

This embodiment provides a time-domain resource allocation apparatus which may be deployed on a base station side, so as to implement the time-domain resource allocation method described above.

Figure 6:
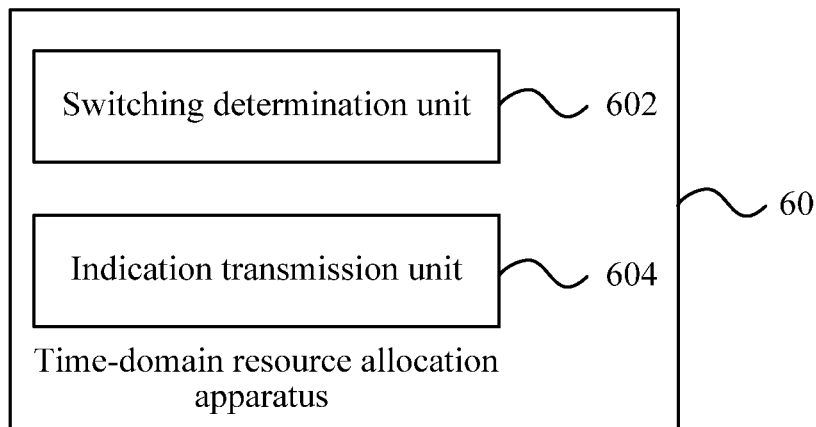
FIG. 6 is a schematic diagram of a structure of a time-domain resource allocation apparatus according to an embodiment three of the present disclosure.

As shown in FIG. 6, the time-domain resource allocation apparatus 60 includes a switching determination unit 602 and an indication transmission unit 604. The switching determination unit 602 is configured to determine a target bandwidth part resource used by a transmission after switching when bandwidth part resource switching needs to be performed on the bandwidth part resource for performing a data transmission with a terminal. The indication transmission unit 604 is configured to send transmission indication information including an index identifier of the target bandwidth part resource and time-domain resource allocation indication information to the terminal. The index identifier is used for the terminal to determine the target bandwidth part resource, the number of switching time slots required for the bandwidth part resource switching is determined according to the target bandwidth part resource and an original bandwidth part resource used before the bandwidth part resource switching, the target time slot deviation for performing the data transmission by using the target bandwidth part resource is determined according to the number of switching time slots and the basic time slot deviation, and the basic time slot deviation is determined through the time-domain resource allocation indication information.

In a process of the data transmission between the base station and the terminal, the type of data transmitted between the base station and the terminal may change continuously, some data may require a relatively large bandwidth resource, and other data may have a low requirement on the bandwidth resource, so that, in order to reduce power consumption caused by transceiving data at the terminal side and to reasonably utilize the bandwidth resource, the switching determination unit 602 of the time-domain resource allocation apparatus 60 may reasonably select one or more bandwidth part resources among all bandwidth part resources configured for the terminal according to the type of data currently to be transmitted. When a bandwidth part resource reselected by the base station is different from a currently used bandwidth part resource, "bandwidth part resource switching" needs to be performed, so the so-called "bandwidth part resource switching" actually refers to a process of switching from a currently used "original bandwidth part resource" to a new "target bandwidth part resource". The "bandwidth part resource" in this embodiment actually refers to a continuous RBs resource, and is also referred to as a BWP resource.

When the switching determination unit 602 determines to perform the switching of the bandwidth part resource used between the base station and the terminal, the base station will obtain an index identifier of the target bandwidth part resource. For example, a downlink data transmission is to be performed between the base station and the terminal, but at this time, the switching determination unit 602 knows that a currently used bandwidth part resource A is unsuitable and a bandwidth part resource C needs to be used, and then the switching determination unit 602 determines that C is to be served as the target bandwidth part resource, thereby obtaining the index identifier of the target bandwidth part resource as "c".

After the switching determination unit 602 determines the target bandwidth part resource, the indication transmission unit 604 sends transmission indication information to the terminal, where the transmission indication information carries the index identifier of the target bandwidth part resource. In this embodiment, the indication transmission unit 604 sends the transmission indication information to the terminal by using the original bandwidth part resource, so in some examples, the indication transmission unit 604 will send the transmission indication information by using the bandwidth part resource A. In some examples of this embodiment, the transmission indication information may include, but is not limited to, downlink control information (DCI).

Meanwhile, the transmission indication information sent by the indication transmission unit 604 includes time-domain resource allocation indication information used for specifying a basic time slot deviation to the terminal, the basic time slot deviation is used for calculating a target time slot deviation after the terminal side calculates a number of switching time slots required for the bandwidth part resource switching. The indication transmission unit 604 may use a time-domain resource allocation indication field in the transmission indication information (such as, the DCI information) as the time-domain resource allocation indication information, and the time-domain resource allocation indication field specifies the basic time slot deviation to the terminal by cooperating with the time-domain resource allocation table. After the base station configures the time-domain resource allocation table, the terminal may obtain the time-domain resource allocation table, and in the time-domain resource allocation table, at least two basic time slot deviations may be configured; in order to let the terminal know which one is selected from the at least two basic time slot deviations, the base station will carry the time-domain resource allocation indication field in the DCI information, and the time-domain resource allocation indication field may enable the terminal to select one basic time slot deviation specified by the base station from the time-domain resource allocation table. For example, 16 rows are included in the time-domain resource allocation table, each of the 16 rows is a configured basic time slot deviation, and unique identifiers of the 16 rows are numbers "0", "1" . . . and "15", respectively. In the transmission indication information sent by the indication transmission unit 604 to the terminal, if a value corresponding to the time-domain resource allocation indication field is "2", it represents that the basic time slot deviation specified by the indication transmission unit 604 for the terminal is the one uniquely identified as "2" in the time-domain resource allocation table.

It should be understood that the time-domain resource allocation table is not fixed because it is configured by the base station, therefore, the terminal obtains different time-domain resource allocation tables when configuration of the time-domain resource allocation table by the base station is different. It should be understood that the indication transmission unit 604 and the terminal always use the current time-domain resource allocation table, that is, the newly configured time-domain resource allocation table to determine the basic time slot deviation.

It should be noted that the basic time slot deviation is a time-domain resource position configured by a radio resource control (RRC) layer of the base station and unrelated to a switching duration of the bandwidth part resource switching. The basic time slot deviation may not only be used for determining the target time slot deviation during the bandwidth part resource switching, but also be used for determining the target time slot deviation when the bandwidth part resource switching is not required. For example, in a process of continuously using a certain bandwidth part resource for performing the data transmission between the base station and the terminal, when the indication transmission unit 604 allocates the time-domain resource to the terminal, which is also performed through the time-domain resource allocation table. In this case, a certain basic time slot deviation in the time-domain resource allocation table specified by the indication transmission unit 604 is actually the target time slot deviation. Therefore, the basic time slot deviation does not need to ensure that the terminal has sufficient switching time. When configuring the basic time slot deviation, the base station does not need to care about whether the bandwidth part resource switching exists, and only needs to configure the basic time slot deviation according to the usual time-domain resource configuration scheme. Therefore, compared with the target time slot deviation exclusively used in a bandwidth part resource switching scenario and configured by the base station in the switching-dedicated indication row in the scheme discussed at this stage, the step in which the base station configures the basic time slot deviation in this embodiment is simpler, without considering the time limitation caused by the bandwidth part resource switching.

In the time-domain resource allocation table, the basic time slot deviation includes an uplink basic time slot deviation and/or a downlink basic time slot deviation, where the uplink basic time slot deviation corresponds to K2 in the time-domain resource allocation table, and the downlink basic time slot deviation corresponds to K0 in the time-domain resource allocation table. If the base station currently needs to send data to the terminal, and the terminal needs to receive the data, the basic time slot deviation specified for the terminal from the time-domain resource allocation table by the transmission indication information sent by the indication transmission unit 604 should be the downlink basic time slot deviation for the downlink, that is K0; if the current base station needs to receive data sent by the terminal, the basic time slot deviation specified by the indication transmission unit 604 using the time-domain resource allocation indication information and the time-domain resource allocation table for the terminal should be the uplink basic time slot deviation for the uplink, that is, K2.

In addition, the time-domain resource allocation table in this embodiment is still set in a unit of a bandwidth part resource, that is, each bandwidth part resource has a corresponding time-domain resource allocation table.

It should be understood that, when the time-domain resource allocation apparatus is deployed on the base station, a function of the switching determination unit may be implemented through a processor of the base station, and a function of the indication transmission unit 604 may be implemented through the processor of the base station and a communication device together.

The time-domain resource allocation apparatus provided in this embodiment may send transmission indication information including the index identifier of the target bandwidth part resource through the original bandwidth part resource used before switching to the terminal, so that the terminal determines the target bandwidth part resource according to the index identifier in the transmission indication information, then determines, according to the target bandwidth part resource and the original bandwidth part resource, a number of switching time slots required for the current bandwidth part resource switching, and determines the target slot offset according to the calculated number of switching time slots and the basic time slot deviation specified by the time-domain resource allocation indication information. Therefore, the related scheme that a switching-dedicated indication row exclusively used for indicating the bandwidth part resource switching is configured in the time-domain resource allocation table is abandoned, which is conducive to saving the space of the time-domain resource allocation table, thus the time-domain resource allocation table may carry more indication information of other transmissions. In addition, the base station does not need to indicate the target time slot deviation satisfying the requirement of the switching duration in the time-domain resource allocation table, so that the flexibility of the base station allocating the time-domain resource is improved.

Embodiment Four

Figure 7:
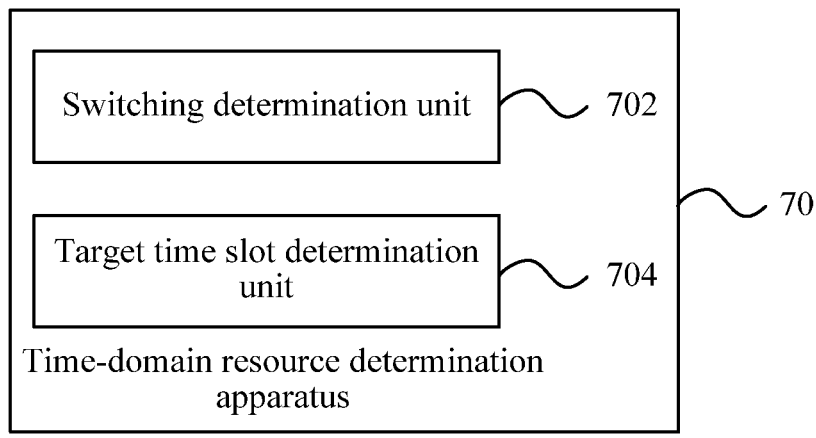
FIG. 7 is a schematic diagram of a structure of a time-domain resource determination apparatus according to an embodiment four of the present disclosure.

This embodiment provides a time-domain resource determination apparatus. The time-domain resource determination apparatus may be deployed on a terminal side to implement the foregoing time-domain resource determination method, referring to a time-domain resource determination apparatus 70 shown in FIG. 7.

The time-domain resource determination apparatus 70 includes a switching determination unit 702 and a target time slot determination unit 704. When determining that bandwidth part resource switching needs to be performed according to transmission indication information received from an original bandwidth part resource, the time-domain resource determination apparatus 70 may determine, according to an index identifier carried in the transmission indication information, a target bandwidth part resource used by a transmission after the bandwidth part resource switching, then the switching determination unit 702 may determine, according to the target bandwidth part resource and an original bandwidth part resource, a number of switching time slots required for current bandwidth part resource switching; the target time slot determination unit 704 is configured to determine a target time slot deviation for performing the data transmission by using the target bandwidth part resource based on the number of switching time slots.

The time-domain resource determination apparatus 70 may receive the transmission indication information sent by the base station, and determine whether the bandwidth part resource switching needs to be performed currently according to the index identifier carried in the transmission indication information. For example, the time-domain resource determination apparatus 70 may perform the "blind detection" on the original bandwidth part resource, and it is assumed that an index identifier of the original part of the bandwidth part resource is "a". Through the blind detection, the time-domain resource determination apparatus 70 may receive the transmission indication information sent by the base station through the original bandwidth part resource A, and the transmission indication information carries the index identifier of the target bandwidth part resource. By comparing whether the index identifier of the original bandwidth part resource is consistent with the index identifier carried in the transmission indication information, the time-domain resource determination apparatus 70 may determine whether the bandwidth part resource switching needs to be performed currently. If the two identifiers are consistent, the bandwidth part resource switching is not required. However, if the two identifiers are inconsistent through a comparison result, the time-domain resource determination apparatus 70 determines that the base station has indicated the time-domain resource determination apparatus 70 to switch to another bandwidth part resource for performing the data transmission with the base station. In this case, the time-domain resource determination apparatus 70 may further determine which one is the target bandwidth part resource indicated by the base station. For example, in the foregoing example, since the index identifier carried by the base station in the transmission indication information is "c", "c" is inconsistent with the index identifier "a" of the original bandwidth part resource A targeted by the blind detection, so the time-domain resource determination apparatus 70 may acquire that the base station instructs the terminal to perform the bandwidth part resource switching, and the target bandwidth part resource used after the switching is C having an index identifier "c".

Figure 8:
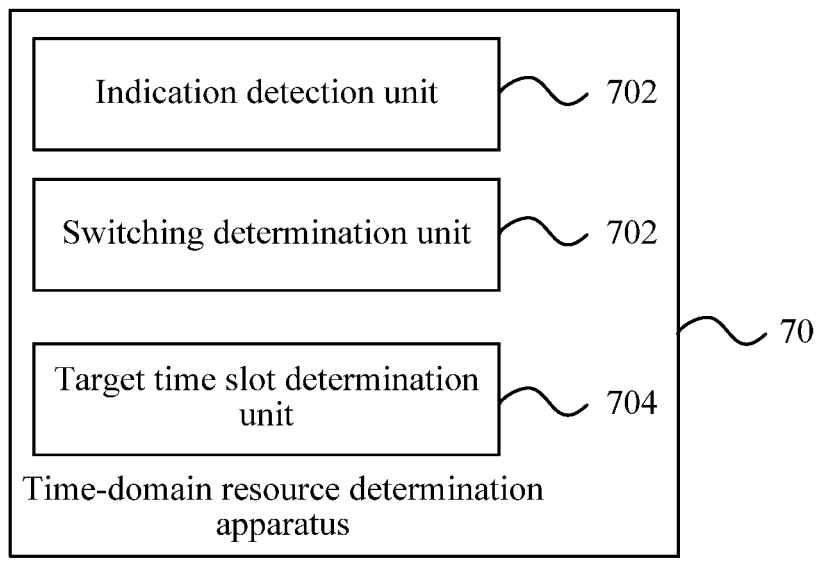
FIG. 8 is a schematic diagram of another structure of the time-domain resource determination apparatus according to the embodiment four of the present disclosure.

In another example of this embodiment, as shown in FIG. 8: the time-domain resource determination apparatus 70 may not only include the switching determination unit 702 and the target time slot determination unit 704, but also includes an indication detection unit 700, which is configured to perform the blind detection on the original bandwidth part resource to obtain the transmission indication information.

Mapping types of shared channels for either the uplink or the downlink are generally divided into two types: a mapping type one (also known as mapping type A) and a mapping type two (also known as mapping type B). In the current standard 38.331, in order to configure DMRS configuration corresponding to the two mapping types more flexibly, the high layer of the base station uses independent DMRS configuration for the mapping type A and the mapping type B. In other words, DMRS configuration parameters of the mapping type A and DMRS configuration parameters of the mapping type B may be the same or different.

For the downlink, a DMRS type in the DMRS configuration parameters (may be "DL-DMRS-config-type" in the DMRS configuration parameters) and a DMRS maximum length (may be "DL-DMRS-max-len" in the DMRS configuration parameters) may affect a size of an antenna port field in the transmission indication information sent by the base station to the terminal, and then affect a size of the transmission indication information.

For the uplink, the DMRS type in the DMRS configuration parameters (may be "UL-DMRS-config-type" in the DMRS configuration parameters), the DMRS maximum length (may be "UL-DMRS-config-type" in the DMRS configuration parameters), and a PUSCH-tp enable value may affect the size of the antenna port field in the transmission indication information sent by the base station to the terminal, and then affect the size of the transmission indication information.

There is no doubt that before receiving the transmission indication information sent by the base station, the indication detection unit 700 does not know whether the base station uses the mapping type A to send the transmission indication information or the mapping type B to send the transmission indication information. Therefore, the indication detection unit 700 may not determine the size of the antenna port field in the transmission indication information, and thus cannot determine the size of the transmission indication information. In this case, if a size value of the blind detection is smaller than the size of the transmission indication information sent by the base station when the indication detection unit 700 performs the blink detection, the indication detection unit 700 will fail in the blind detection. After the blind detection fails, the indication detection unit 700 needs to perform the blind detection again in the same time slot, which increases the complexity of the blind detection. This embodiment provides two manners:

in a manner one: regardless of the DMRS configuration parameters corresponding to the two mapping types, the indication detection unit 700 performs the blind detection on the transmission indication information according to a case where the size of the antenna port field in the transmission indication information has a maximum value.

Table 1 shows, for the downlink shared channel, the corresponding relationship between the DMRS configuration parameters and the antenna port field, and according to table 1, the maximum size of the antenna port indication field is 6 for the downlink, so that if the indication detection unit 700 detects the transmission indication information according to the antenna port indication field of 6, the transmission indication information may be detected by the indication detection unit 700 at one time regardless of the mapping type used by the base station for the transmission.

Table 2 shows, for the uplink shared channel, the corresponding relationship between the DMRS configuration parameters and the antenna port field: Therefore, according to table 2, for the uplink, the maximum size of the antenna port indication field is 5, thus if the indication detection unit 700 performs the detection on the transmission indication information according to the antenna port indication field of 5, the transmission indication information may be detected by the indication detection unit 700 at one time regardless of the mapping type used by the base station for the transmission.

The indication detection unit 700 may also perform the blind detection on the transmission indication information according to the manner two.

First, the indication detection unit 700 inquiries the DMRS configuration parameters corresponding to the mapping type one and the mapping type two, and then determines whether parameters related to the antenna port field in the DMRS configuration parameters corresponding to the two mapping types are the same. If the parameters are the same, the indication detection unit 700 performs the blind detection on the transmission indication information according to a size of the antenna port field corresponding to any one of the two mapping types. If the parameters are different, the indication detection unit 700 performs the blind detection on the transmission indication information according to a larger size of the antenna port field corresponding to the two mapping types.

After the high layer of the base station configures the configuration parameter corresponding to each mapping type of a shared channel, the terminal side may obtain a configuration parameter of the mapping type A of the shared channel and a configuration parameter of the mapping type B of the shared channel, and both of the configuration parameter of the mapping type A in the shared channel and the configuration parameter of the mapping type B in the shared channel include the DMRS configuration parameters, so the indication detection unit 700 may inquiry and determine the DMRS configuration parameter corresponding to the mapping type A and the DMRS configuration parameter corresponding to the mapping type B.

The so-called parameters related to the antenna port field refer to parameters that may affect the size of the antenna port field. For the downlink, the parameters related to the antenna port field which may be inquired by the indication detection unit 700 include a DMRS type and a DMRS maximum length. For the uplink, the parameters related to the antenna port field which may be inquired by the indication detection unit 700 include the DMRS type, the DMRS maximum length and a PUSCH-tp enable value.

If the indication detection unit 700 determines that the parameters related to the antenna port field in the DMRS configuration parameter corresponding to the two mapping types are different, for example, supposing that the indication detection unit 700 inquiries that DL-DMRS-config-type corresponding to the mapping type A of the downlink shared channel is equal to 1 and DL-DMRS-max-len corresponding to the mapping type A of the downlink shared channel is equal to 2, while DL-DMRS-config-type corresponding to the mapping type B of the downlink shared channel is equal to 1 and DL-DMRS-max-len corresponding to the mapping type B of the downlink shared channel is equal to 1; then if the base station sends the transmission indication information according to the mapping type A, the size of the antenna port field in the transmission indication information should be 5, and if the base station sends the transmission indication information according to the mapping type B, the size of the antenna port field should be 4. Although at this time the indication detection unit 700 may not determine whether the size of the antenna port field in the transmission indication information sent by the base station is 5 or 4, in order to detect the transmission indication information at one time, the indication detection unit 700 may directly detect the transmission indication information according to a larger size of the antenna port field corresponding to the two mapping types, that is, in the above example, the transmission indication information is detected according to the antenna port field of 5.

After the time-domain resource determination apparatus 70 determines, according to the index identifier carried in the transmission indication information, the target bandwidth part resource used by a transmission after the bandwidth part resource switching, the switching determination unit 702 may determine, according to the target bandwidth part resource and the original bandwidth part resource used before the bandwidth part resource switching, a number of switching time slots required for the current bandwidth part resource switching.

It should be understood that not all bandwidth part resources require a same switching duration. Even the target bandwidth part resource is the same, the required switching duration may be different if switching from different original bandwidth part resources; similarly, even the original bandwidth part resource is the same, but the target bandwidth part resource is different, the required switching duration may also be different. Let alone a switching scenario in which the target bandwidth part resource and the original bandwidth part resource are both different. Therefore, different switching scenarios may correspond to different switching durations.

In this embodiment, the switching scenario is mainly determined according to a relationship between configuration parameters of the original bandwidth part resource and configuration parameters of the target bandwidth part resource: in one switching scenario, the original bandwidth part resource and the target bandwidth part resource have a same BW, but have different center frequencies; in another switching scenario, the original bandwidth part resource and the target bandwidth part resource have a same center frequency, but have different BWs. In the foregoing embodiments, four switching scenarios for the bandwidth part resource switching have been introduced, and after determining the target bandwidth part resource, the switching determination unit 702 may determine, according to the configuration parameter of the target bandwidth part resource and the configuration parameter of the original bandwidth part resource, which one of the several scenarios the current bandwidth part resource switching scenario belongs to. It should be understood that after the base station configures the bandwidth part resource for the terminal, the terminal side will store the configuration parameters of each bandwidth part resource. Of course, in other examples of this embodiment, even the terminal side does not store the configuration parameters of each bandwidth part resource, the base station may also inform the switching determination unit 702 through the transmission indication information.

It is assumed that the target bandwidth part resource C and the original bandwidth part resource A have a same BW, but have different center frequencies. Therefore, according to the configuration parameters of the two bandwidth part resources, the switching determination unit 702 may determine that the bandwidth part resource switching currently required to be performed belongs to the bandwidth part resource switching in the scenario one.

In this embodiment, the time-domain resource determination apparatus 70 pre-stores the mapping relationship between switching scenarios and the switching durations, and each switching scenario has a corresponding switching duration. In other examples of this embodiment, the switching duration is not only related to the switching scenario, but also related to the frequency level of a carrier used for communication between the terminal and the base station, and the capability of the terminal. For example, in one example, the time-domain resource determination apparatus 70 stores a scenario-duration mapping relationship table, as shown in table 3 of the embodiment one.

In a column of the frequency level in table 3, "1" represents a scenario in which the carrier frequency is less than 6 GHz, and "2" represents a scenario in which the carrier frequency is greater than or equal to 6 GHz. "Switching duration of the type one" corresponds to switching durations in various switching scenarios with the terminal having a high capability, while "switching duration of the type two" corresponds to switching durations in various switching scenarios with the terminal having a low capability.

After determining the current bandwidth part resource switching scenario, the switching determination unit 702 may determine the corresponding switching duration according to the carrier frequency band used for the communication and the capability of the terminal. Assuming that a certain terminal having a high capability uses the band level 1 for the communication, and the switching determination unit 702 determines that the current bandwidth part resource switching scenario is the scenario one, the switching determination unit 702 determines that a switching duration of 600 us is required for the current bandwidth part resource switching by inquiring table 3.

After the switching determination unit 702 determines the switching duration, the switching duration is converted into the number of switching time slots. It should be understood that the number of switching time slots is not only related to the switching duration, but also related to the subcarrier spacing of the target bandwidth part resource. The switching determination unit 702 may firstly determine the time slot length corresponding to the subcarrier spacing of the target bandwidth part resource, then calculate a ratio of the switching duration to the single time slot length, and the number of switching time slots is calculated by rounding up the ratio.

After the switching determination unit 702 calculates the number of switching time slots, based on the number of switching time slots, the target time slot determination unit 704 may determine a value of the target time slot deviation, that is, a position where the target time-domain resource is located, and the target bandwidth part resource is used for performing the data transmission.

In this embodiment, when the bandwidth part resource switching needs to be performed, the transmission indication information sent by the base station to the time-domain resource determination apparatus 70 includes time-domain resource allocation indication information, and the target time slot determination unit 704 may determine the basic time slot deviation according to the time-domain resource allocation indication information in conjunction with a time-domain resource allocation table of the target bandwidth part resource. Here, the transmission indication information is the DCI information for description: the DCI includes a time-domain resource allocation field, and the time-domain resource allocation field is used for specifying a certain row in the time-domain resource allocation table, that is, for specifying one from two basic time slot deviations in the time-domain resource allocation table. Then, the target time slot determination unit 704 sums the basic time slot deviation and the number of switching time slots to determine the target time slot deviation corresponding to the current bandwidth part resource switching.

It should be understood that the target time slot determination unit 704 determines the target time slot deviation so as to determine a time slot position for performing the data transmission between the terminal and the base station, and therefore, not only the time-domain resource determination apparatus 70 on the terminal side needs to determine the target time slot deviation, but the base station should also know the target time slot deviation. In order to enable the base station and the terminal to perform a normal data transmission at the target time-domain resource position corresponding to the target time slot deviation, the target time slot deviation determined by the base station and the target time slot deviation determined by the target time slot determination unit 704 should be consistent. Therefore, the base station side should also calculate the target time slot deviation in a same manner as the terminal side, which requires that the base station and the target time slot determination unit 704 use a same criteria for determining the switching scenario to which the current bandwidth part resource switching belongs, and the base station and the target time slot determination unit 704 store a same mapping relationship between switching scenarios and switching durations (for example, the base station also stores table 3), and in addition, the base station needs to know the capability of the terminal and the like.

After determining the target time slot deviation, the terminal and the base station may perform the data transmission at the target time-domain resource position corresponding to the target time slot deviation. It should be understood that the target time slot deviation may include an uplink target time slot deviation and/or a downlink target time slot deviation. It is assumed that the target time slot deviation determined by the target time slot determination unit 704 is the downlink target time slot deviation, the terminal may receive data sent by the base station at the corresponding target time slot deviation; and if the target time slot deviation determined by the target time slot determination unit 704 is the uplink target time slot deviation, the terminal may send data to the base station at the corresponding target time slot deviation.

When the time-domain resource determination apparatus 70 is deployed on the terminal, each of functions of the time-domain resource determination apparatus 70, the switching determination unit 702, and the target time slot determination unit 704 in the time-domain resource determination apparatus 70 may be implemented by a processor of the terminal. A function of the indication detection unit 700 may be implemented by the processor of the terminal and a communication unit together.

In the time-domain resource determination apparatus provided by the embodiments of the present disclosure, the base station does not need to set a switching-dedicated indication row in the time-domain resource allocation table exclusively for the bandwidth part resource switching. Since the time-domain resource determination apparatus on the terminal side may determine the number of switching time slots required for the current switching according to the original bandwidth part resource and the target bandwidth part resource to calculate the target time slot deviation, thereby avoiding a dedicated indication row to be set in the time-domain resource allocation table, thus affecting the time-domain resource allocation table carrying indication information of other transmissions. It also avoids a situation in the related scheme that in the scenario of not requiring the bandwidth part resource switching, the space of the time-domain resource allocation table is wasted, since the switching-dedicated indication row needs to be set in the time-domain resource allocation table all the time. It is conducive to optimizing the resource transmission, and improving resource utilization rate.

Furthermore, when the base station configures the time-domain resource allocation table, it does not need to care about whether the configured transmission time slot satisfies the switching duration of the terminal performing the bandwidth part resource switching, so the configuration of the time-domain resource allocation table is simpler.

Embodiment Five

This embodiment provides a storage medium, and the storage medium may store one or more computer programs which may be read, compiled, and executed by one or more processors. In this embodiment, the storage medium may store at least one of a time-domain resource allocation program or a time-domain resource determination program, where the time-domain resource allocation program may be executed by the one or more processors to implement steps of any one time-domain resource allocation method described in the embodiment one and the embodiment two; the time-domain resource determination program may be executed by the one or more processors to implement steps of any one time-domain resource determination method described in the embodiment one and the embodiment two.

Figure 9:
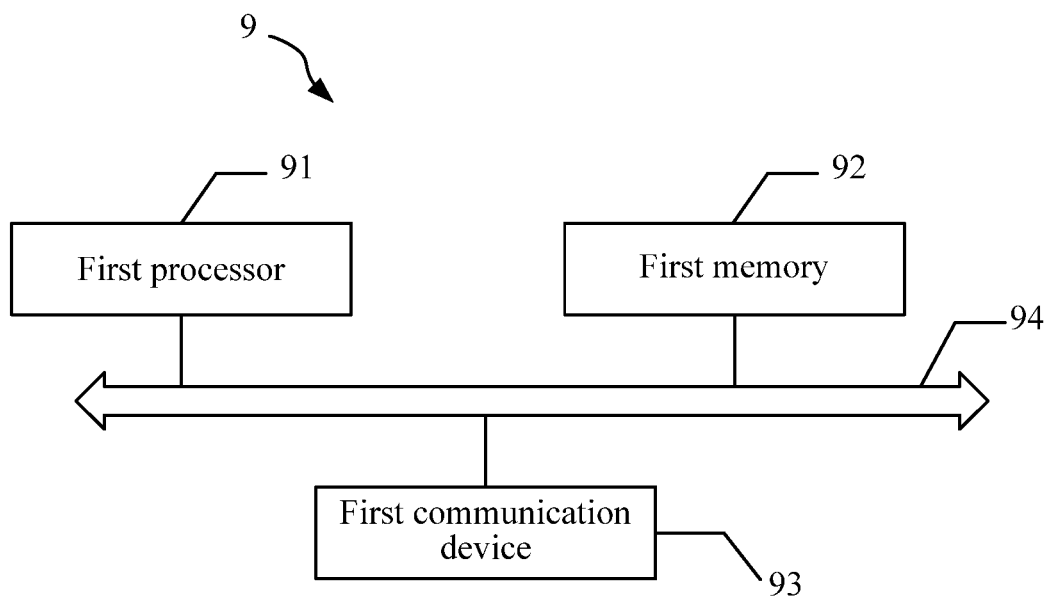
FIG. 9 is a schematic diagram of a hardware structure of a base station according to an embodiment five of the present disclosure.

This embodiment further provides a base station, referring to a schematic diagram of a hardware structure of a base station shown in FIG. 9:

The base station 9 includes a first processor 91, a first memory 92, a first communication device 93, and a first communication bus 94. The first communication bus 94 is configured to respectively implement a communication connection between the first memory 92 and the first processor 91 and a communication connection between the first communication device 93 and the first processor 91.

The first memory 92 may be the foregoing storage medium for storing the time-domain resource allocation program. The first processor 91 may read, compile and execute the time-domain resource allocation program stored in the first memory 92, to implement steps of any one time-domain resource allocation method described in the embodiment one and the embodiment two, together with the first communication device 93.

When it is determined that bandwidth part resource switching needs to be performed on a bandwidth part resource for performing the data transmission with the terminal, the first processor 91 determines a target bandwidth part resource used by a transmission after switching, and controls the first communication device 93 to send transmission indication information including an index identifier of the target bandwidth part resource to the terminal through an original bandwidth part resource used before switching. The index identifier in the transmission indication information allows the terminal to determine the target bandwidth part resource, and to determine a number of switching time slots required for current bandwidth part resource switching according to the target bandwidth part resource and the original bandwidth part resource. At the same time, the transmission indication information also carries time-domain resource allocation indication information, the terminal may determine a basic time slot deviation specified by the base station 9 according to the time-domain resource allocation indication information, and then determines a target time slot deviation for performing the data transmission by using the target bandwidth part resource in conjunction with the number of switching time slots.

Details about the first processor 91 of the base station 9 executing the time-domain resource allocation program to implement the time-domain resource allocation method may refer to the introduction in the foregoing embodiments, which will not be repeated here.

Figure 10:
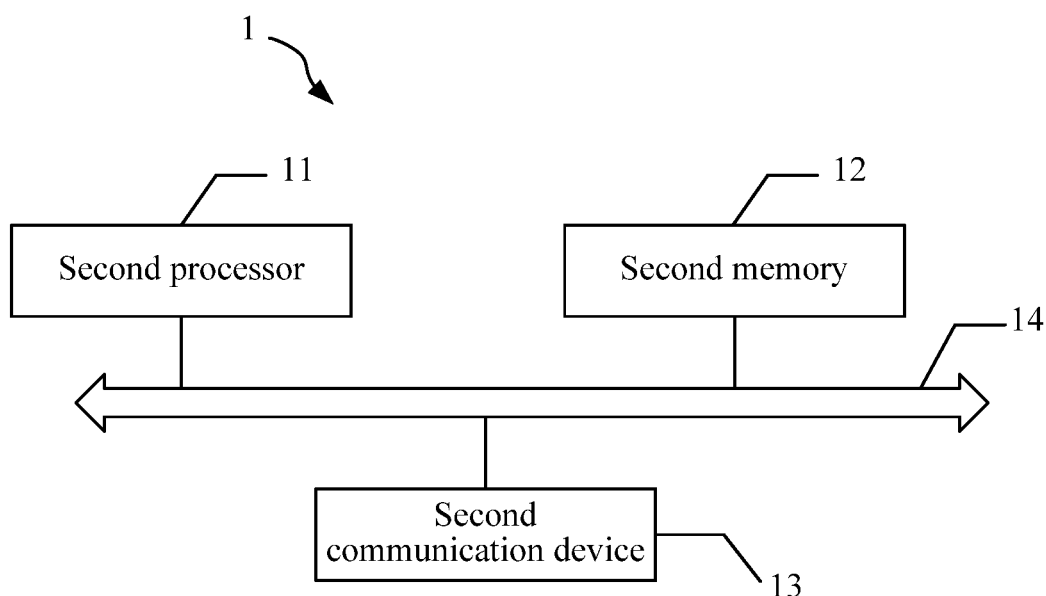
FIG. 10 is a schematic diagram of a hardware structure of a terminal according to an embodiment five of the present disclosure.

This embodiment further provides a terminal and FIG. 10 provides a schematic diagram of a hardware structure of the terminal.

The terminal 1 includes a second processor 11, a second memory 12, a second communication device 13, and a second communication bus 14 for connecting the second processor 11 and the second memory 12, and the second processor 11 and the second communication device 13.

The second memory 12 may be the foregoing storage medium storing the time-domain resource determination program. The second processor 11 may read, compile and execute the time-domain resource determination program stored in the second memory 12, to implement steps of any one time-domain determination method described in the embodiment one and the embodiment two, together with the second communication device 13.

The second communication device 13 may receive transmission indication information under control of the second processor 11, the second processor 11 may determine whether bandwidth part resource switching needs to be performed according to the transmission indication information received by the second communication device 13. When determining that the bandwidth part resource switching needs to be performed, the second processor 11 determines a target bandwidth part resource for transmission after the bandwidth part resource switching according to an index identifier carried in the transmission indication information, and determines a number of switching time slots required for current bandwidth part resource switching according to the target bandwidth part resource and the original bandwidth part resource. Then, the second processor 11 determines a target time slot deviation for performing the data transmission by using the target bandwidth part resource based on the number of switching time slots and the basic time slot deviation specified by time-domain resource allocation indication information in the transmission indication information.

Details about the second processor 11 of the terminal 1 executing the time-domain resource determination program to implement the time-domain resource determination method may refer to the introduction in the foregoing embodiments, which will not be repeated here.

The base station, terminal, and storage medium provided in this embodiment may allow the terminal to determine the number of switching time slots according to the information provided by the base station, so as to determine the target slot deviation, which does not need to rely on the switching-dedicated indication row in the time-domain resource allocation table, thus greatly reducing occupation of the time-domain resource allocation table by the bandwidth part resource switching, saving the space of the time-domain resource allocation table, providing more transmission opportunities for indication information of other transmissions, and conducive to implementing the resource optimization configuration.

Those skilled in the art should understand that the time-domain resource allocation method and apparatus, the time-domain resource determination method and apparatus, base station, terminal, and storage medium provided in the embodiments of the present application may be applied not only to the 5G communication system, but also to any one future communication system.

Apparently, it should be understood by those skilled in the art that each of the modules or steps in the embodiments of the present disclosure described above may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a computer storage medium (such as a read only memory (ROM)/random access memory (RAM), a magnetic disk or an optical disk) and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present application is not limited to any combination of hardware and software.

The above content is a further detailed description of the present disclosure in conjunction with the alternative embodiments, and the implementation of the present disclosure is not limited to the description. For those skilled in the art to which the present application pertains, a number of simple deductions or substitutions may be implemented without departing from the concept of the present application and should fall within the protection scope of the present application.

What is claimed is:

1. A time-domain resource determination method, comprising:

receiving transmission indication information sent by a base station, wherein the transmission indication information carries an index identifier of a target bandwidth part resource and time-domain resource allocation indication information;

determining, according to an original bandwidth part resource and the target bandwidth part resource, a number of switching time slots required for current bandwidth part resource switching, wherein the original bandwidth part resource is a bandwidth part resource used by a terminal before the current bandwidth part resource switching, the target bandwidth part resource is a bandwidth part resource used by the terminal after the current bandwidth part resource switching, and the target bandwidth part is determined according to the index identifier of the target bandwidth part resource carried in the transmission indication information; and determining, according to the number of switching time slots and a basic time slot deviation, a target time slot deviation for performing a data transmission by using the target bandwidth part resource, wherein the basic time slot deviation is determined according to the time-domain resource allocation indication information carried in the transmission indication information;

wherein receiving the transmission indication information sent by the base station comprises:

performing a blind detection on the original bandwidth part resource in one of following two manners to obtain the transmission indication information:

in a manner one:
performing the blind detection on the transmission indication information according to a case where a size of an antenna port field in the transmission indication information has a maximum value; or in a manner two:

inquiring a demodulation reference signal (DMRS) configuration parameter corresponding to a mapping type one and a DMRS configuration parameter corresponding to a mapping type two respectively;

in a case where a parameter related to an antenna port field in the DMRS configuration parameter corresponding to the mapping type one is the same as a parameter related to an antenna port field in the DMRS configuration parameter corresponding to the mapping type two, performing the blind detection on the transmission indication information according to a size of the antenna port field corresponding to one of the mapping type one or the mapping type two;

in a case where the parameter related to the antenna port field in the DMRS configuration parameter corresponding to the mapping type one is different from the parameter related to the antenna port field in the DMRS configuration parameter corresponding to the mapping type two, performing the blind detection on the transmission indication information according to a larger size between a size of the antenna port field corresponding to the mapping type one and a size of the antenna port field corresponding to the mapping type two.

2. The method of claim 1, wherein determining, according to the original bandwidth part resource and the target bandwidth part resource, the number of switching time slots required for the current bandwidth part resource switching comprises:
   determining a current switching scenario according to a configuration parameter of the original bandwidth part resource and a configuration parameter of the target bandwidth part resource;
   determining a switching duration corresponding to the current switching scenario according to a pre-stored mapping relationship between switching scenarios and switching durations; and
   determining the number of switching time slots required for the current bandwidth part resource switching according to the switching duration and the configuration parameter of the target bandwidth part resource.

3. The method of claim 2, wherein the configuration parameter of the target bandwidth part resource comprises a subcarrier spacing of the target bandwidth part resource; and
   determining the number of switching time slots required for the current bandwidth part resource switching according to the switching duration and the configuration parameter of the target bandwidth part resource comprises:
      determining a time slot length corresponding to the subcarrier spacing of the target bandwidth part resource; and
      obtaining the number of switching time slots required for the current bandwidth part resource switching by rounding up a ratio of the switching duration to the time slot length.

4. The method of claim 1, wherein the time-domain resource allocation indication information comprises a time-domain resource allocation indication field, and the time-domain resource allocation indication field is used for specifying one of at least two basic time slot deviations in a time-domain resource allocation table; and before determining, according to the number of switching time slots and the basic time slot deviation, the target time slot deviation for performing the data transmission by using the target bandwidth part resource, the method further comprises:
   determining, according to an indication of the time-domain resource allocation indication field, the basic time slot deviation specified by the base station from the time-domain resource allocation table.

5. The method of claim 1, wherein in a case where data reception is currently required to be performed, the parameter related to the antenna port field in the DMRS configuration parameter comprises: a DMRS type and a DMRS maximum length;
   in a case where data sending is currently required to be performed, the parameter related to the antenna port field in the DMRS configuration parameter comprises: a DMRS type, a DMRS maximum length, and a physical uplink shared channel-transform precoder (PUSCH-tp) enable value.

6. The method of claim 1, wherein the basic time slot deviation comprises an uplink basic time slot deviation or a downlink basic time slot deviation.

7. The method of claim 1, wherein the transmission indication information comprises downlink control information (DCI).

8. A terminal, comprising a processor, a memory, a communication device, and a communication bus; wherein
   the communication bus is configured to implement a connection communication between the processor and the memory and a connection communication between the processor and the communication device; and
   the processor is configured to execute at least one program stored in the memory to implement the time-domain resource determination method of claim 1.

9. A non-transitory storage medium, storing a time-domain resource determination program, wherein the time-domain resource determination program is executable by at least one processor to implement the time-domain resource determination method of claim 1.

10. The method of claim 2, wherein the basic time slot deviation comprises an uplink basic time slot deviation or a downlink basic time slot deviation.

11. The method of claim 3, wherein the basic time slot deviation comprises an uplink basic time slot deviation or a downlink basic time slot deviation.

12. The method of claim 4, wherein the basic time slot deviation comprises an uplink basic time slot deviation or a downlink basic time slot deviation.

13. A time-domain resource determination apparatus, comprising:
   an indication detection unit, which is configured to receive transmission indication information sent by a base station, wherein the transmission indication information carries an index identifier of a target bandwidth part resource and time-domain resource allocation indication information;
   a switching determination unit, which is configured to determine, according to an original bandwidth part resource and a-the target bandwidth part resource, a number of switching time slots required for current bandwidth part resource switching, wherein the original bandwidth part resource and the target bandwidth part resource are respectively a bandwidth part resource used by a terminal before the current bandwidth part resource switching, a bandwidth part resource used by the terminal after the current bandwidth part resource switching, and the target bandwidth part is determined according to the index identifier of the target bandwidth part resource carried in the transmission indication information; and
   a target time slot determination unit, which is configured to determine, according to the number of switching time slots and a basic time slot deviation, a target time slot deviation for performing a data transmission by using the target bandwidth part resource, wherein the basic time slot deviation is determined according to the time-domain resource allocation indication information carried in the transmission indication information;
   wherein the indication detection unit is further configured to receive the transmission indication information sent by the base station in the following manner: performing a blind detection on the original bandwidth part resource in one of following two manners to obtain the transmission indication information:
   in a manner one:
      performing the blind detection on the transmission indication information according to a case where a size of an antenna port field in the transmission indication information has a maximum value; or in a manner two:
inquiring a demodulation reference signal (DMRS) configuration parameter corresponding to a mapping type one and a DMRS configuration parameter corresponding to a mapping type two respectively;

in a case where a parameter related to an antenna port field in the DMRS configuration parameter corresponding to the mapping type one is the same as a parameter related to an antenna port field in the DMRS configuration parameter corresponding to the mapping type two, performing the blind detection on the transmission indication information according to a size of the antenna port field corresponding to one of the mapping type one or the mapping type two;

in a case where the parameter related to the antenna port field in the DMRS configuration parameter corresponding to the mapping type one is different from the parameter related to the antenna port field in the DMRS configuration parameter corresponding to the mapping type two, performing the blind detection on the transmission indication information according to a larger size between a size of the antenna port field corresponding to the mapping type one and a size of the antenna port field corresponding to the mapping type two.

14. A time-domain resource allocation apparatus, comprising:

a switching determination unit, which is configured to determine a target bandwidth part resource used by a transmission after current bandwidth part resource switching; and an indication transmission unit, which is configured to send transmission indication information containing both of an index identifier of the target bandwidth part resource and time-domain resource allocation indication information to a terminal the switching determination unit is further configured to determine, according to an original bandwidth part resource and the target bandwidth part resource, a number of switching time slots required for the current bandwidth part resource switching, wherein the original bandwidth part resource is a bandwidth part resource used by the terminal before the current bandwidth part resource switching; determine, according to the number of switching time slots and a basic time slot deviation, a target time slot deviation for performing the transmission by using the target bandwidth part resource, wherein the basic time slot deviation is a time slot deviation specified in the time-domain resource allocation indication information.

* * * * *